United States Patent
Yamada

(10) Patent No.: US 7,139,130 B2
(45) Date of Patent: Nov. 21, 2006

(54) ZOOM LENS, AND OPTICAL APPARATUS USING THE SAME

(75) Inventor: Katsu Yamada, Matsubara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/968,024

(22) Filed: Oct. 20, 2004

(65) Prior Publication Data

US 2005/0088756 A1     Apr. 28, 2005

(30) Foreign Application Priority Data

Oct. 22, 2003     (JP)     ............... 2003-362580

(51) Int. Cl.
*G02B 15/14*     (2006.01)
(52) U.S. Cl. .............. 359/687; 359/684; 396/55
(58) Field of Classification Search ........... 359/687, 359/684; 396/52, 55
See application file for complete search history.

(56) References Cited

U.S. PATENT DOCUMENTS

| | | | | |
|---|---|---|---|---|
| 3,736,048 | A * | 5/1973 | Cook et al. ............. | 359/683 |
| 5,719,708 | A | 2/1998 | Nagaoka | |
| 6,404,561 | B1 | 6/2002 | Isono et al. | |
| 6,414,800 | B1 | 7/2002 | Hamano | |
| 6,473,231 | B1 | 10/2002 | Hamano et al. | |
| 6,606,194 | B1 * | 8/2003 | Hamano et al. ........... | 359/557 |
| 6,606,202 | B1 * | 8/2003 | Hoshi ...................... | 359/687 |
| 6,751,029 | B1 * | 6/2004 | Horiuchi ................... | 359/687 |
| 6,999,240 | B1 * | 2/2006 | Yamada et al. ........... | 359/683 |
| 6,999,241 | B1 * | 2/2006 | Yamada et al. ........... | 359/686 |

FOREIGN PATENT DOCUMENTS

| | | |
|---|---|---|
| JP | 7-128619 | 5/1995 |
| JP | 8-29737 | 2/1996 |
| JP | 8-160299 A | 6/1996 |
| JP | 8-160300 A | 6/1996 |
| JP | 10-260356 A | 9/1998 |
| JP | 11-237551 A | 8/1999 |
| JP | 2000-227552 A | 8/2000 |
| JP | 2001-116996 A | 4/2001 |
| JP | 2001-117004 A | 4/2001 |
| JP | 2001-221948 A | 8/2001 |
| JP | 2002-107622 A | 4/2002 |
| JP | 2002-287028 A | 10/2002 |
| JP | 2002-365540 | * 12/2002 |
| JP | 2002-365540 A | 12/2002 |
| JP | 2003-98434 | 4/2003 |
| JP | 2003-295057 A | 10/2003 |
| WO | WO 01/27677 A1 | 4/2001 |

* cited by examiner

*Primary Examiner*—Jordan M. Schwartz
(74) *Attorney, Agent, or Firm*—McDermott Will & Emery LLP

(57) ABSTRACT

A zoom lens includes, arranged in order from an object side to an image plane side, a first lens group having a positive optical power, fixed with respect to an image plane; a second lens group having a negative optical power, movable in a direction parallel to an optical axis for performing a zooming action; a third lens group having a positive optical power, including a movable lens element having at least one aspherical surface and movable in a direction perpendicular to the optical axis for compensating for a blurred image; and a fourth lens group having a positive optical power, movable in the direction parallel to the optical axis for adjusting a focus, the zoom lens satisfies the predetermined conditional expression.

17 Claims, 29 Drawing Sheets

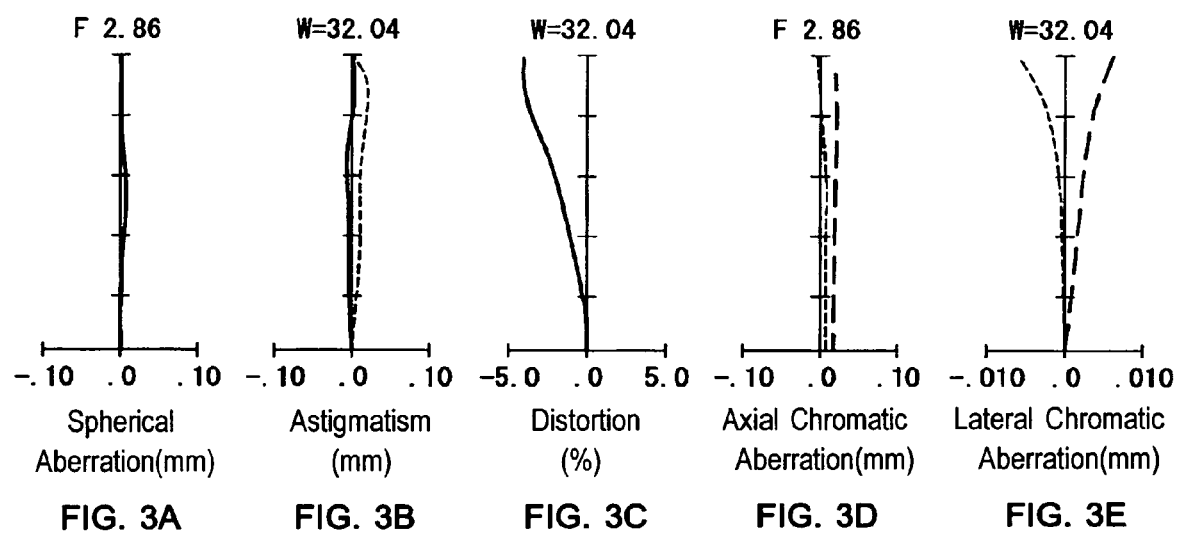

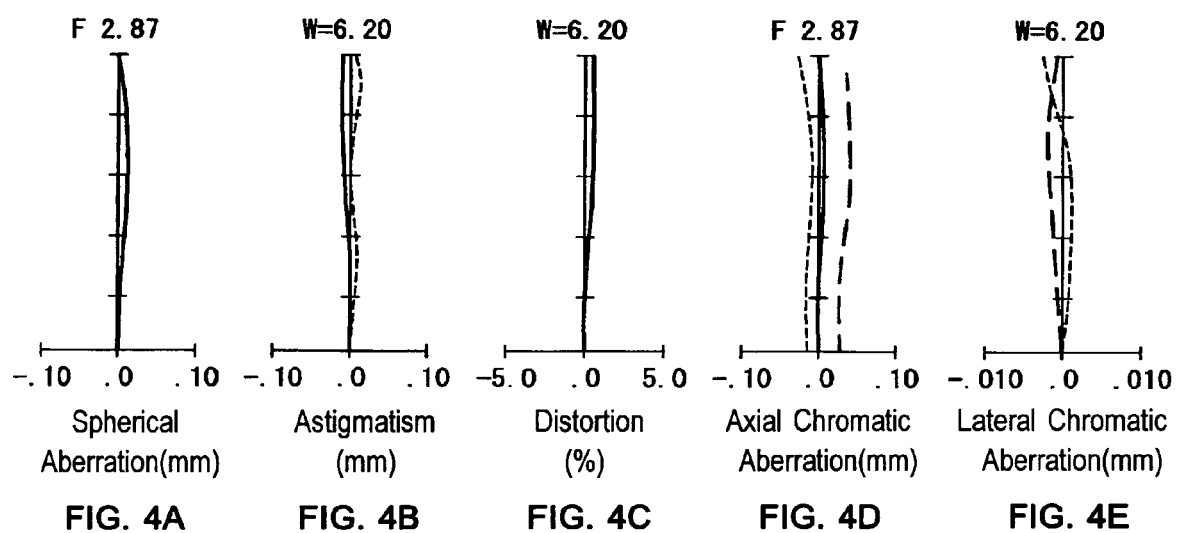

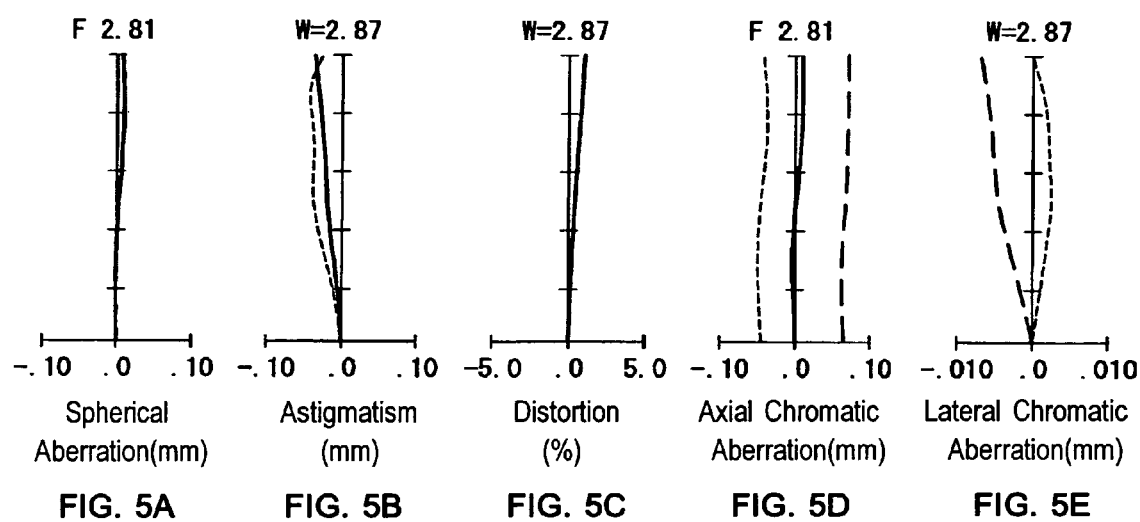

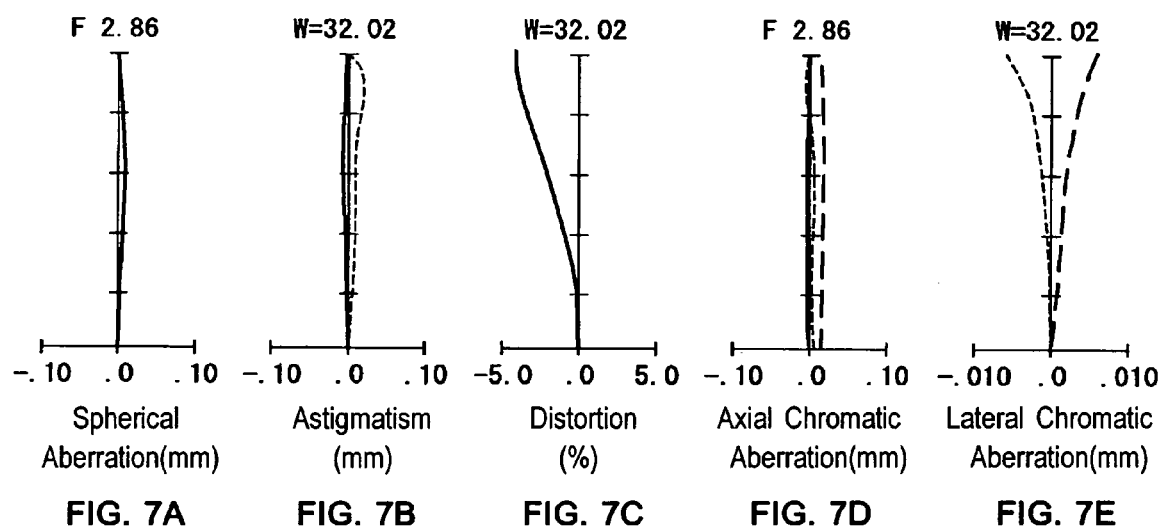

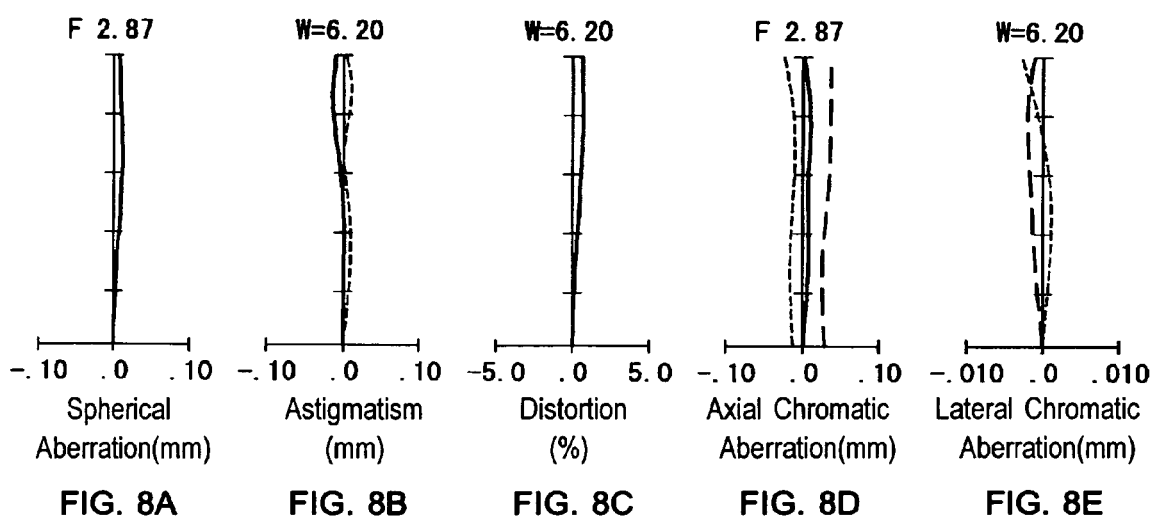

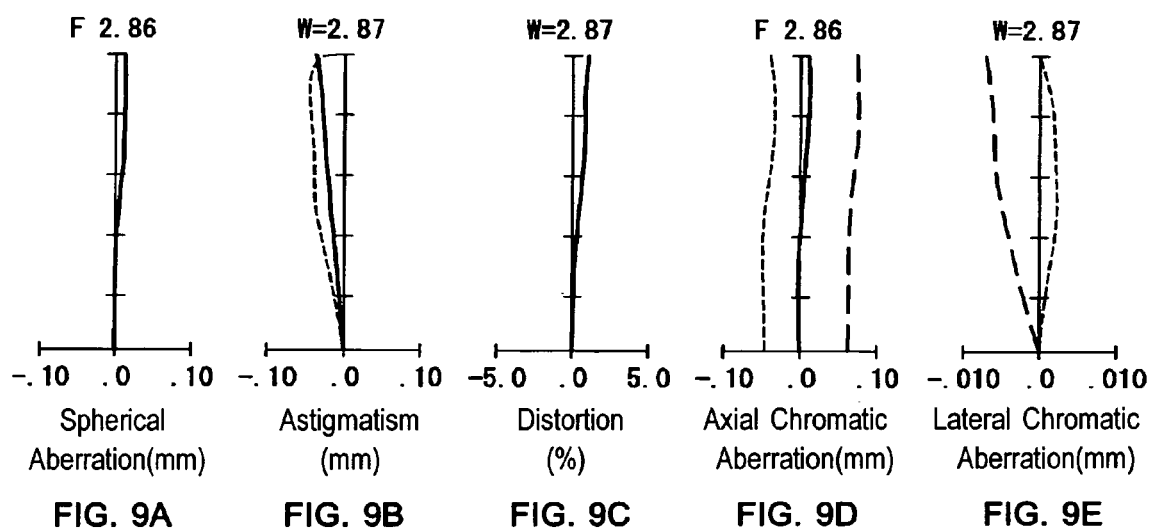

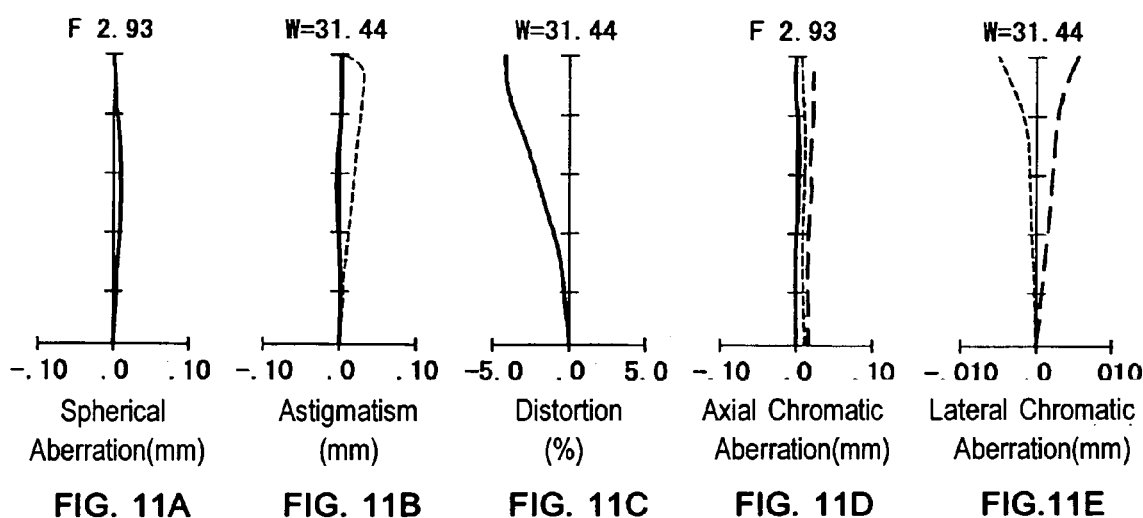

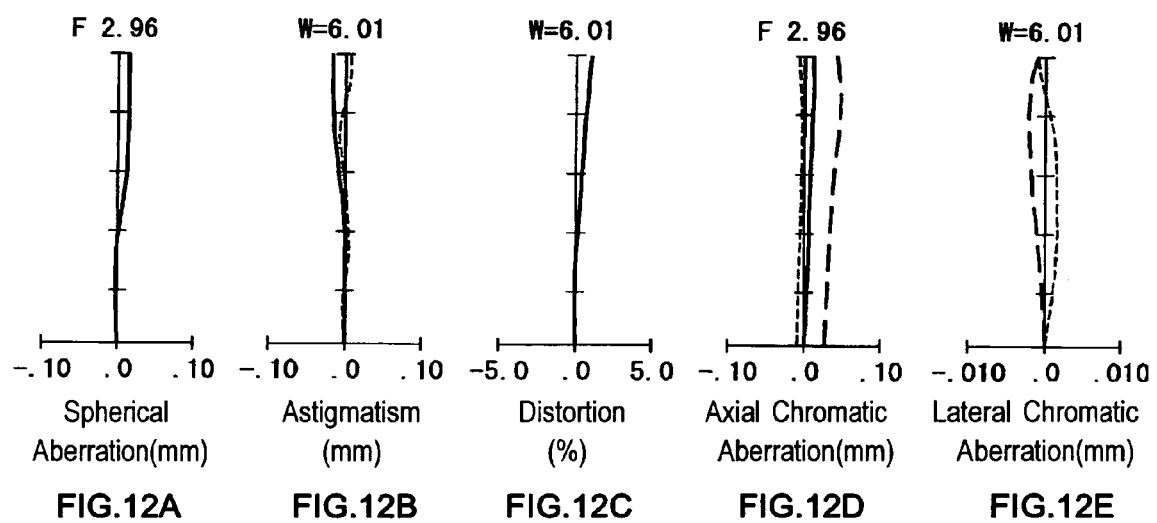

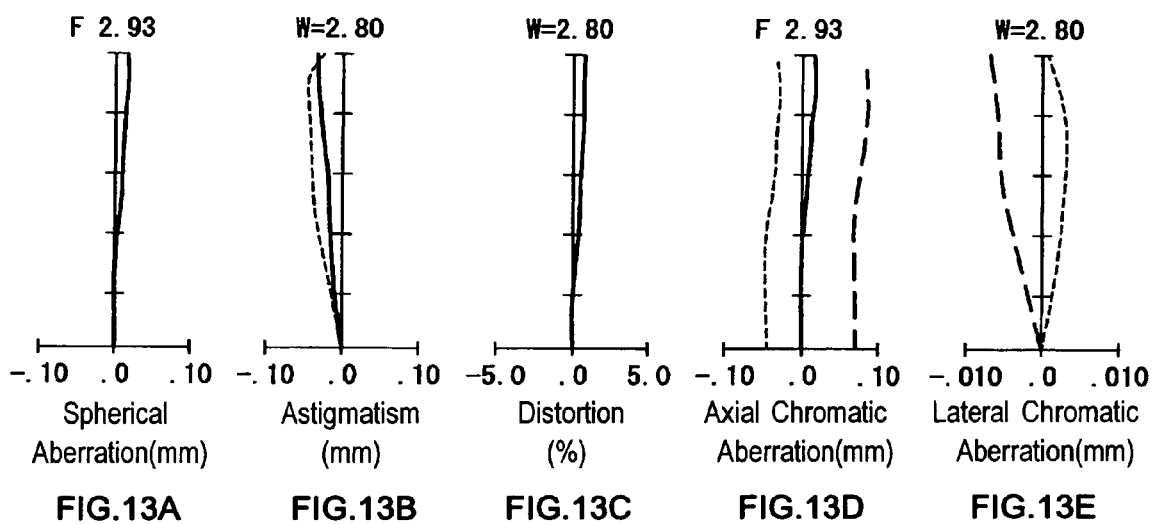

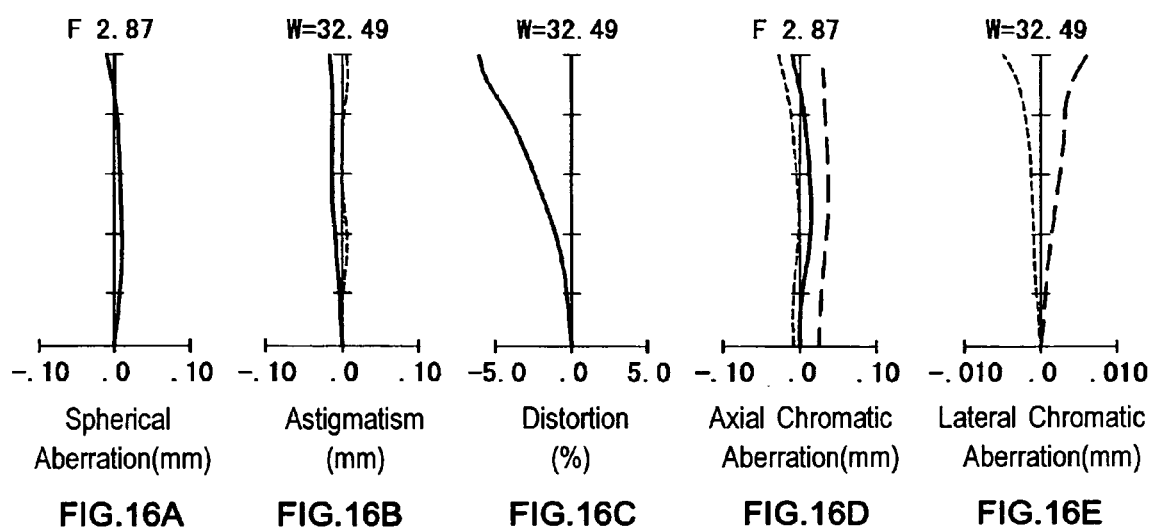

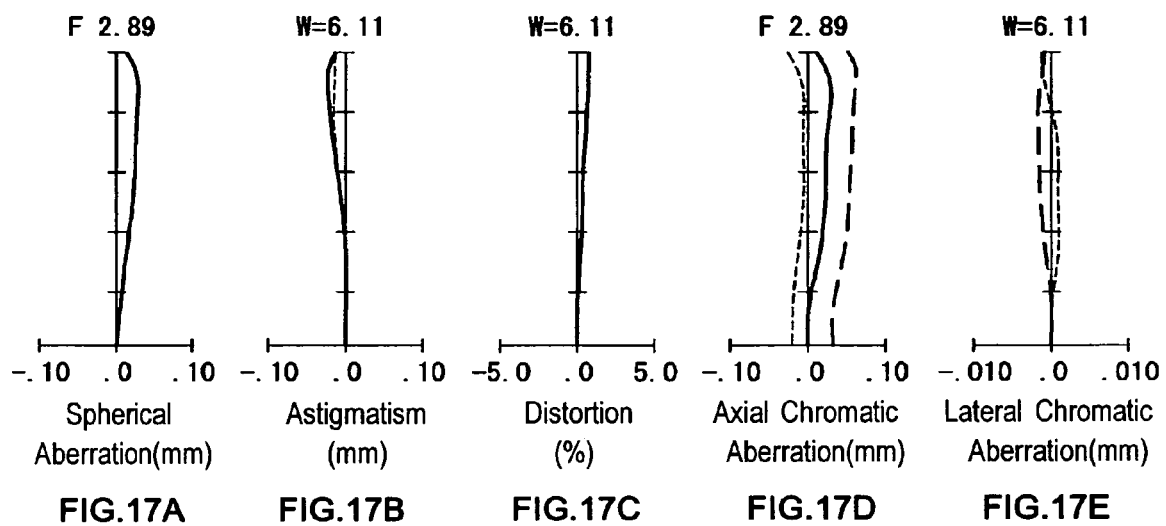

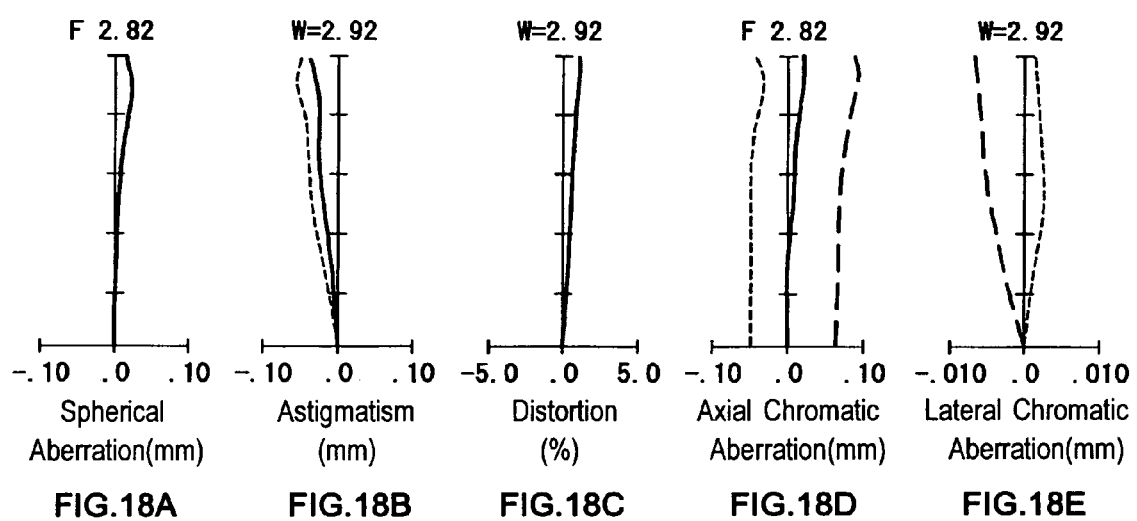

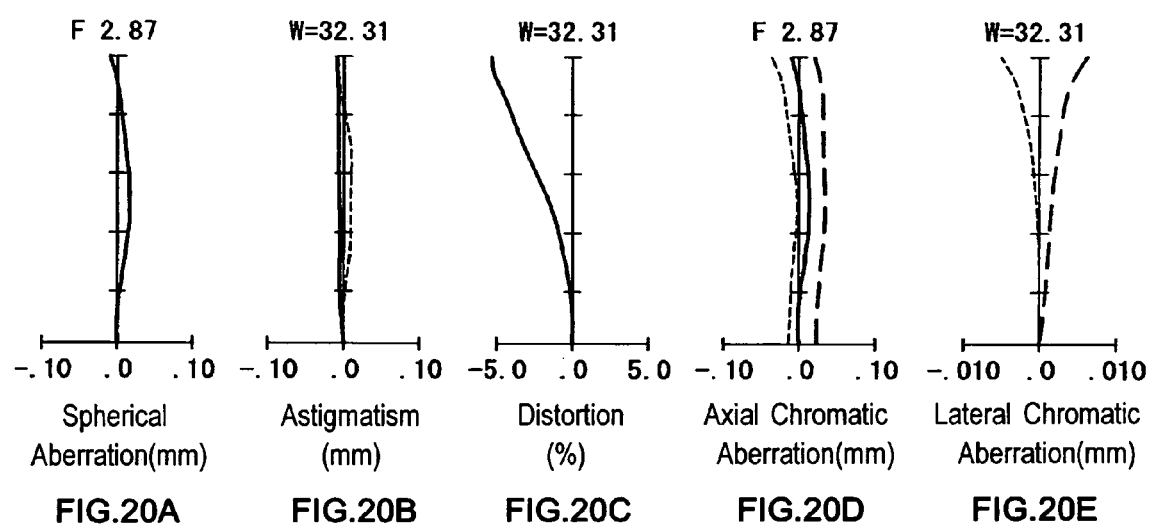

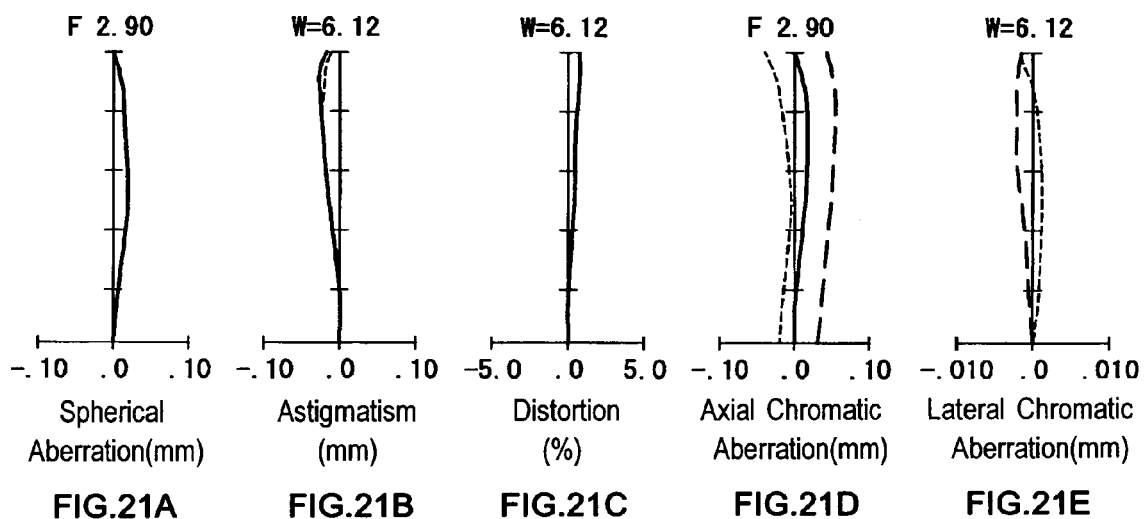

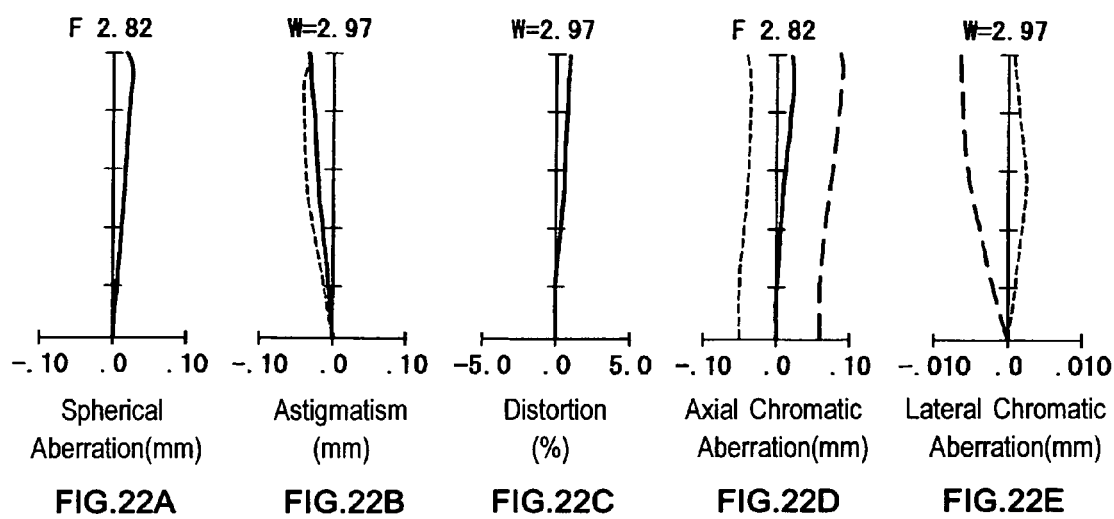

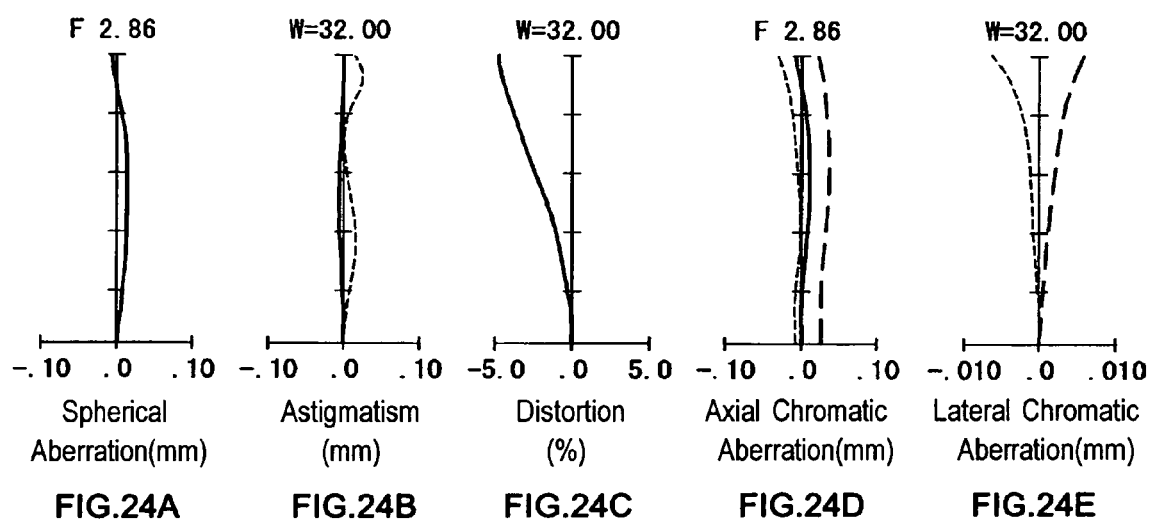

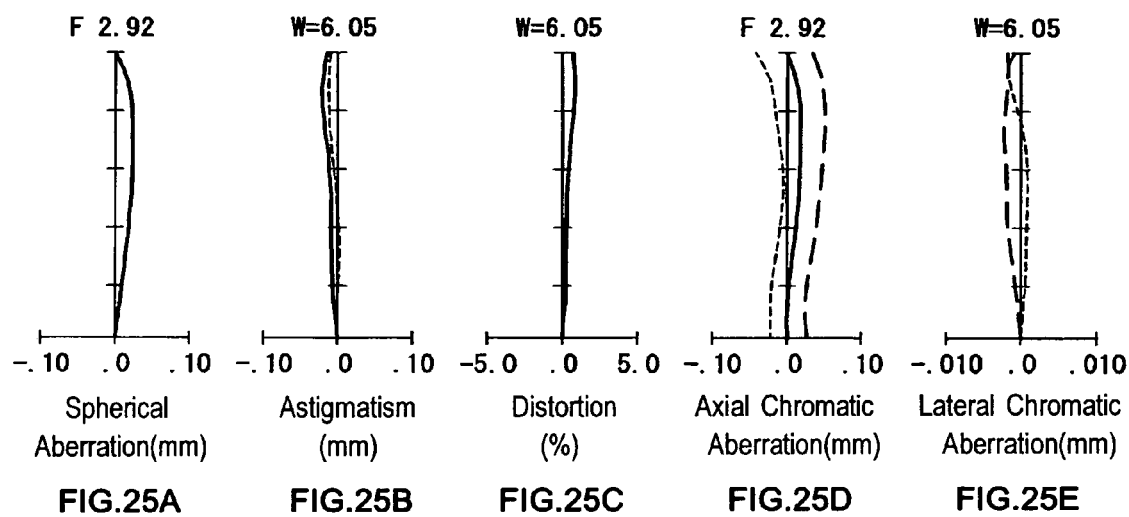

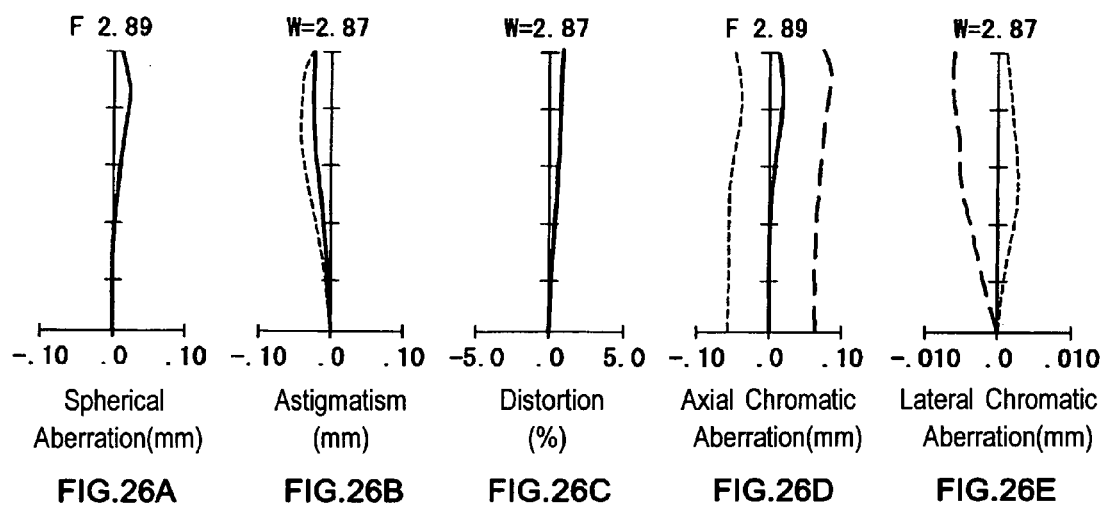

ZOOM LENS, AND OPTICAL APPARATUS USING THE SAME

BACKGROUND

1. Technical Field

The present invention relates to a zoom lens for use in video cameras, digital still cameras and the like that are provided with a blurred image compensation function for optically compensating blurring of images caused by camera shake, vibration and the like, and also to an optical apparatus such like video camera and digital still camera using such the zoom lens.

2. Description of the Background Art

Recently, the anti-shaking function of preventing vibrations such as camera shake is becoming essential for image capturing systems such as video cameras, and various types of anti-shaking optical systems have been proposed.

For example, in the video camera disclosed in JP H8-029737A, an optical system for camera shake correction constituted by two lenses is mounted at the front of a zoom lens and one of the two lenses is moved perpendicularly to the optical axis so as to compensate for fluctuation of the image caused by camera shake.

Also, in the video camera disclosed in JP H7-128619A, a four-group zoom lens is used and a portion of the third lens group constituted by a plurality of lenses is moved perpendicularly to the optical axis so as to compensate for fluctuation of the image caused by camera shake.

However, in the video camera disclosed in JP H8-029737A described above, the lens diameter of the optical system for camera shake correction is increased since the optical system for camera shake correction is mounted at the front of the zoom lens. The size of the video camera itself and the load on the actuating system are increased correspondingly, so that the system is unfavorable in order to reduce the size, weight and energy consumption.

In the video camera disclosed in JP H7-128619A above, since a part of the third lens group which is fixed with respect to the image plane is moved perpendicular to the optical axis so as to correct fluctuation of the image, this type of system is more favorable in terms of the size compared to the type in which the optical system for camera shake correction is mounted at the front of the zoom lens. However, the deterioration in chromatic aberration during camera shake correction is unavoidable because a part of the third lens group is moved.

SUMMARY

The novel concepts disclosed herein were achieved in order to solve the foregoing problems in the conventional art, and herein is disclosed a four-group zoom lens that are able to compensate for a blurred image by moving the whole of a third lens group, in a direction perpendicular to the optical axis, and also a video camera and a digital still camera using the zoom lens.

To achieve the foregoing, a zoom lens includes, arranged in order from an object side to an image plane side, a first lens group having a positive optical power, fixed with respect to an image plane; a second lens group having a negative optical power, movable in a direction parallel to an optical axis for performing a zooming action; a third lens group having a positive optical power, including a movable lens element having at least one aspherical surface and movable in a direction perpendicular to the optical axis for compensating for a blurred image; and a fourth lens group having a positive optical power, movable in the direction parallel to the optical axis for adjusting a focus, the zoom lens satisfies the following conditional expression:

$$0.006 < |dsagi/CL| < 0.02$$

wherein

CL is an effective lens diameter of the ata least one aspherical surface, and dsagi is an amount of asphericity at the effective lens diameter.

As described above, in the first aspect, it is possible to realize a zoom lens that has blurred image compensation function and yields high optical performance, wide-angle and high zoom ratio.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3A–E show longitudinal aberration diagrams for the wide angle end according to numerical example 1;

FIGS. 4A–E show longitudinal aberration diagrams for the standard position according to numerical example 1;

FIGS. 5A–E show longitudinal aberration diagrams for the telephoto end according to numerical example 1;

FIGS. 7A–E show longitudinal aberration diagrams for the wide angle end according to numerical example 2;

FIGS. 8A–E show longitudinal aberration diagrams for the standard position according to numerical example 2;

FIGS. 9A–E show longitudinal aberration diagrams for the telephoto end according to numerical example 2;

FIGS. 11A–E show longitudinal aberration diagrams for the wide angle end according to numerical example 3;

FIGS. 12A–E show longitudinal aberration diagrams for the standard position according to numerical example 3;

FIGS. 13A–E show longitudinal aberration diagrams for the telephoto end according to numerical example 3;

FIGS. 16A–E show longitudinal aberration diagrams for the wide angle end according to numerical example 4;

FIGS. 17A–E show longitudinal aberration diagrams for the standard position according to numerical example 4;

FIGS. 18A–E show longitudinal aberration diagrams for the telephoto end according to numerical example 4;

FIGS. 20A–E show longitudinal aberration diagrams for the wide angle end according to numerical example 5;

FIGS. 21A–E show longitudinal aberration diagrams for the standard position according to numerical example 5;

FIGS. 22A–E show longitudinal aberration diagrams for the telephoto end according to numerical example 5;

FIGS. 24A–E show longitudinal aberration diagrams for the wide angle end according to numerical example 6;

FIGS. 25A–E show longitudinal aberration diagrams for the standard position according to numerical example 6;

FIGS. 26A–E show longitudinal aberration diagrams for the telephoto end according to numerical example 6;

DESCRIPTION OF THE PREFERRED EMBODIMENTS

[First and Second Embodiments]

Figure 1:
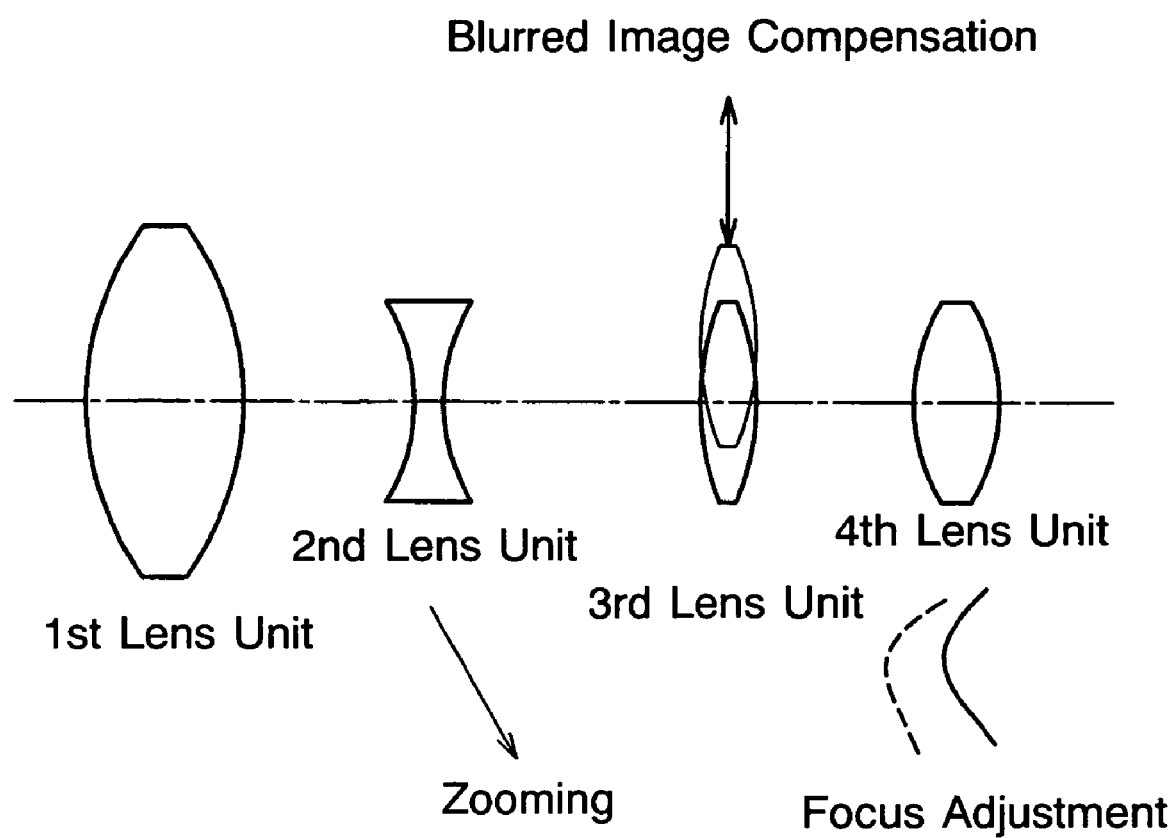
FIG. 1 is a diagram showing the basic configuration of a zoom lens having a blurred image compensation function.

FIG. 1 shows the basic configuration of a zoom lens of first and second embodiment, having blurred image compensation. As shown in FIG. 1, the zoom lens as disclosed herein is a four-group zoom lens made up of a first lens group having a positive optical power, a second lens group a negative optical power, a third lens group a positive optical power and a fourth lens group a positive optical power, arranged in that order from an object side to an image plane side. In this case, a magnification action (zooming) is performed by moving the second lens group and the fourth lens group in a direction parallel to the optical axis, and focus adjustment is performed by moving the fourth lens group in a direction parallel to the optical axis. Also, the third lens group is moved in a direction perpendicular to the optical axis so as to compensate for the fluctuation of the image when camera shake occurs (blurred image).

In the zoom lens of the first embodiment and the second embodiment, while the first and third lens groups are fixed with respect to the image plane, the second and fourth lens groups are moved in a direction parallel to the optical axis during zooming ation. Moreover, the fourth lens group is moved in a direction parallel to the optical axis during focus adjustment. Furthermore, the third lens group is moved in a direction perpendicular to the optical axis in order to compensate for the blurred image.

Figure 2:
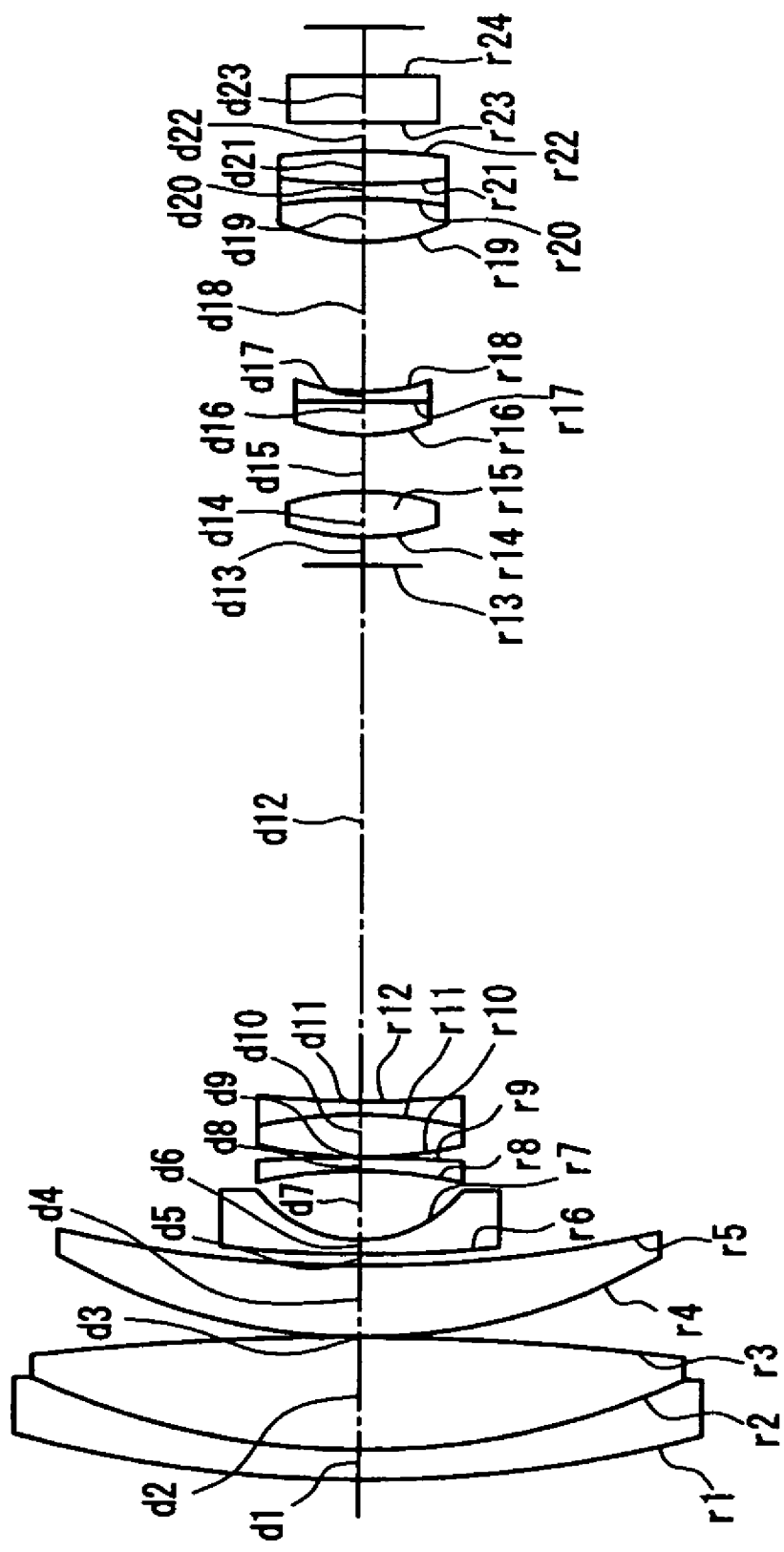
FIG. 2 is a layout drawing showing the configuration of a zoom lens of the first embodiment according to numerical examples 1 to 3.

FIG. 2 is a layout drawing showing the configuration of a zoom lens of the first embodiment. In FIG. 2, the lens group denoted by r1 to r5 is the first lens group, the lens group denoted by r6 to r12 is the second lens group, the lens group denoted by r14 to r18 is the third lens group and the lens group denoted by r19 to r22 is the fourth lens group. Additionally, the optical components denoted by r23 and r24 in FIG. 2 are an optical low-pass filter and a flat plate that is equivalent to the faceplate of a CCD.

The first lens group have, sequentially from the object side to the image plane side, a negative meniscus lens element convex to the object side, a positive lens element having a biconvex shape and a positive meniscus lens element convex to the object side. The first lens element counting from the object side is cemented the second lens element counting from the object side together.

The second lent group have, sequentially from the object side to the image plane side, a negative meniscus lens element convex to the object side, a negative meniscus lens element concave to the object side, a positive lens element having a biconvex shape and a negative lens element having a biconcave shape. The third lens element counting from the object side is cemented the fourth lens element counting from the object side together.

The third lens group have, sequentially from the object side to the image plane side, a positive lens element having a biconvex shape, a positive lens element having a biconvex shape and a negative lens element having a biconcave shape. The second lens element counting from the object side is cemented the third lens element counting from the object side together.

The fourth lens group have, sequentially from the object side to the image plane side, a positive lens element having a biconvex shape, a negative lens element having a biconcave shape and a positive lens element having a biconvex shape. All of lens groups are cemented each other.

Figure 15:
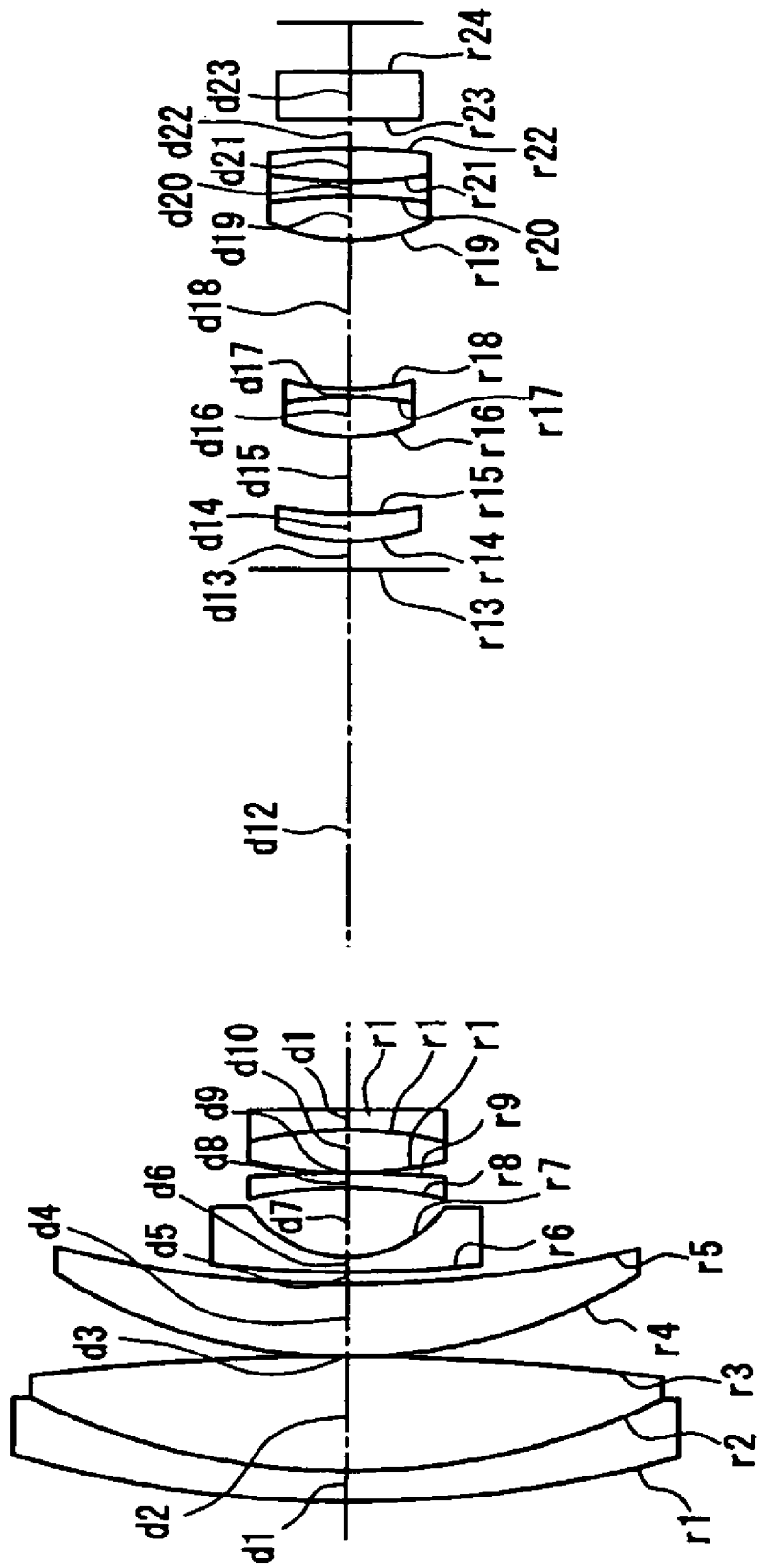
FIG. 15 is a layout drawing showing the configuration of a zoom lens of the second embodiment according to numerical examples 4 to 6.

FIG. 15 is a layout drawing showing the configuration of a zoom lens of the second embodiment. In FIG. 15, the third lens group, comparing with the first embodiment, has only difference in which the most object side lens element in the third lens group is a positive meniscus lens element convex to the object side.

Subsequently, conditions to be satisfied by the zoom lens of the embodiments will be described. It is unnecessary to satisfy all the conditions at the same time. By satisfying each of conditions, corresponding effect of conditions will be attained.

It is desirable for the zoom lens of the embodiments to satisfy the range defined by the following conditional expression (1).

$$0.006 < |dsagi/CL| < 0.02 \quad (1)$$

wherein

CL is an effective lens diameter of the ata least one aspherical surface, and dsagi is an amount of asphericity at the effective lens diameter.

It should be noted that the aspherical surface is defined by the following formula (AS):

$$SAG = \frac{h^2/R}{1+\sqrt{1-(1+K)(h/R)^2}} + D \cdot h^4 + \quad \text{(AS)}$$
$$E \cdot h^6 + F \cdot h^8 + G \cdot h^{10} + H \cdot h^{12} + I \cdot h^{14} + J \cdot h^{16}$$

In formula (AS) above, h denotes the height from the optical axis, SAG denotes the distance (sag amount) from the apex of the aspherical surface to the point on the aspherical surface where the height from the optical axis is h, R denotes the radius of curvature at the apex of the aspherical surface, K denotes the conic constant, and D, E, F, G, H, I and J denote the aspheric surface coefficients.

By introducing an aspherical surface in a lens located in the vicinity of the aperture stop where the ray height increases, aberration can be corrected effectively. However, the introduction of an aspherical surface may cause processing errors such as surface misalignment. When the lens shape deviates from the design values, then a desired performance may not be attained. The above-described conditional expression (1) is defined to attain good aberration properties even when processing errors occur. When the value of the conditional expression (1) is falls below the lower limit, the performance tends not to deteriorate even when processing errors occur on the aspherical surface. However, at the same time, the effect of introducing an aspherical surface is difficult to be achieved, thus making it difficult to correct aberration sufficiently. When the value of the conditional expression (1) exceeds the upper limit, although it is possible to correct aberration favorably, the performance deterioration becomes significant in the occurrence of processing errors.

More preferably, the following conditional expression (1)' is satisfied.

$$0.006 < |dsagi/CL| < 0.01 \quad (1)'$$

It is desirable for the zoom lens of the embodiments to satisfy the range defined by the following conditional expressions (2) to (4).

$$0.035 < dP_{g,F12} < 0.070 \quad (2)$$

$$0.045 < dP_{g,d12} < 0.080 \quad (3)$$

$$-0.040 < dP_{C,A'12} < -0.020 \quad (4)$$

wherein $dP_{g,F12}$ is a constant of anomalous dispersion of the second lens element of the first lens group, counted from the object side, with respect to partial dispersion ratio for the g-line (435 nm) and F-line (486 nm), $dP_{g,d12}$ is a constant of anomalous dispersion of the second lens element of the first lens group, counted from the object side, with respect to partial dispersion ratio for the g-line (435 nm) and d-line (587 nm), and $dP_{C,A'12}$ is a constant of anomalous dispersion of the second lens element of the first lens group, counted from the object side, with respect to partial dispersion ratio for the C-line (656 nm) and A'-line (768 nm).

Here, selecting two glass types, namely, 511605 (refractive index $n_d$=1.5112, Abbe number $v_d$=60.49) and 620363 (refractive index $n_d$=1.62004, Abbe number $v_d$=36.30) as normal optical glasses, the straight line linking the two points representing these two glass types on a diagram in which the partial dispersion ratio is plotted on the vertical axis and the Abbe number is plotted on the horizontal axis is taken as the standard line. The difference between the partial dispersion ratio of the glass type used for each lens and the partial dispersion ratio corresponding to the Abbe number of the glass type on the standard line is expressed as $dP_{x,y}$.

The above-described conditional expressions (2) to (4) are conditions that are necessary to correct chromatic aberration at the shorter wavelength side and the longer wavelength side simultaneously. To correct the chromatic aberration at two or more different wavelengths, a material with a large anomalous dispersion is required. The conditional expressions (2) to (4) represent the anomalous dispersion properties from the shorter wavelengths to the longer wavelengths. By using a material that simultaneously satisfies the conditions of the conditional expressions (2) to (4), the chromatic aberration at two or more different wavelengths can be corrected favorably.

It is desirable for the zoom lens of the embodiments to satisfy the range defined by the following conditional expressions (5) to (7).

$$-0.040 < dP_{g,F11} - dP_{g,F12} < -0.020 \quad (5)$$

$$-0.055 < dP_{g,d11} - dP_{g,d12} < -0.025 \quad (6)$$

$$0.018 < dP_{C,A'11} - dP_{C,A'12} < 0.036 \quad (7)$$

wherein $dP_{g,F11}$ is a constant of anomalous dispersion of the first lens element of the first lens group, counted from the object side, with respect to partial dispersion ratio for the g-line (435 nm) and F-line (486 nm), $dP_{g,d11}$ is a constant of anomalous dispersion of the first lens element of the first lens group, counted from the object side, with respect to partial dispersion ratio for the g-line (435 nm) and d-line (587 nm), $dP_{C,A'}$ is a constant of anomalous dispersion of the first lens element of the first lens group, counted from the object side, with respect to partial dispersion ratio for the C-line (656 nm) and A'-line (768 nm), $dP_{g,F12}$ is a constant of anomalous dispersion of the second lens element of the first lens group, counted from the object side, with respect to partial dispersion ratio for the g-line (435 nm) and F-line (486 nm), $dP_{g,d12}$ is a constant of anomalous dispersion of the second lens element of the first lens group, counted from the object side, with respect to partial dispersion ratio for the g-line (435 nm) and d-line (587 nm), and $dP_{C,A'12}$ is a constant of anomalous dispersion of the second lens element of the first lens group, counted from the object side, with respect to partial dispersion ratio for the C-line (656 nm) and A'-line (768 nm).

The above-described conditional expressions (5) to (7) are conditions for a lens having a negative refractive power and a lens having a positive refractive power in the case of correcting the chromatic aberration at two or more different wavelengths. By combining materials such that the differences in the constants of anomalous dispersion between these lenses satisfy the conditional expressions (5) to (7), the chromatic aberration at two or more different wavelengths can be corrected favorably.

It is desirable for the zoom lens of the embodiments to satisfy the range defined by the following conditional expression (8).

$$0.50 < f_{31}/f_{32} < 1.00 \quad (8)$$

where $f_{31}$ is a focal length of the first lens of the third lens group, counted from the object side, and $f_{32}$ is a focal length of the second lens of the third lens group, counted from the object side.

By setting the refractive powers of the first lens and the second lens of the third lens group, counted from the object side, as the above-described conditional expression (8), the angles of deviation of rays of light incident on these lenses can be optimized, so that spherical aberration can be corrected favorably. When the value of the conditional expression (8) falls below the lower limit, the refractive power of the first lens of the third lens group, counted from the object side, becomes too large, so that spherical aberration tends to occur in the direction of the object side. When the value of the conditional expression (8) exceeds the upper limit, the refractive power of the first lens of third lens group, counted from the object side, becomes too small, so that spherical aberration tends to occur in the direction of the image plane side.

More preferably, the following conditional expression (8)' is satisfied.

$$0.80 < f_{31}/f_{32} < 0.95 \quad (8)'$$

In the zoom lens of the above-described configuration, it is also preferable that the third lens group includes a meniscus convex lens element, a convex lens element and a concave lens element, arranged in that order from the object side to the image plane side, and the following conditional expression (9) is satisfied.

$$0.01 < |p_2/p_1| < 0.06 \quad (9)$$

wherein p$_1$ is a power of the object side surface of the meniscus convex lens, and p$_2$ is a power of the image plane side surface of the meniscus convex lens.

To correct aberration favorably, it is preferable to impart a small refractive power to the object side surface where rays of light travel through higher positions. When the value of the above-described conditional expression (9) falls below the lower limit, the refractive power of the object side surface becomes too small and the refractive power of the image plane side surface becomes too large, thus making it difficult to correct aberration favorably. When the value of the conditional expression (9) exceeds the upper limit, the curvature of the object side surface and that of the image plane side surface become similar to each other, resulting in a lens shape that is difficult to be processed. By satisfying the conditional expression (9), the image plane side surface is made concave, so that the lenses do not have to be fixed to the frame of a lens barrel at its spherical portions when they are fixed to the lens barrel. As a result, tilting and decentering of the lens will not occur. Furthermore, since the refractive power of the image plane side surface is small, the performance of a single lens is less deteriorated due to surface misalignment as compared to a biconvex lens.

More preferably, the following conditional expression (9)' is satisfied.

$$0.015<|p_1/p_2|<0.035 \tag{9}'$$

In the zoom lens of the above-described configuration, it is also preferable that the third lens group includes a meniscus convex lens element, a convex lens element and a concave lens element, arranged in that order from the object side to the image plane side, and the following conditional expressions (10) and (11) are satisfied.

$$n_{d31}>1.65 \tag{10}$$

$$|v_{d31}-v_{d32}|<0.6 \tag{11}$$

wherein n$_{d31}$ is a refractive index of the meniscus convex lens element, which is the first lens element of the third lens group, counted from the object side, v$_{d31}$ is an Abbe number of the meniscus convex lens element, which is the first lens element of the third lens group, counted from the object side, and v$_{d32}$ is an Abbe number of the convex lens element, which is the second lens element of the third lens group, counted from the object side.

When the value of the conditional expression (10) falls below the lower limit, the refractive power of the lens surface becomes too strong, so that spherical aberration and coma aberration tend to occur. When the value of the conditional expression (11) exceeds the upper limit, chromatic aberration will be overcorrected.

In the zoom lens of the above-described configuration, it is also preferable the following conditional expression (12) is satisfied.

$$15<R/RIH<210 \tag{12}$$

wherein

RIH is an image height, and

R is a radius of curvature of the concave surface of the fourth lens group that is located closest to the image side.

In the case of cementing lenses together, it is necessary to fill an adhesive having a low refractive index between the lens surfaces to be cemented, resulting in a large refractive index difference between the adhesive and the lenses. This becomes a cause of ghosting or flare. It is undesirable that the value of the conditional expression (12) falls below the lower limit, since ghosting or flare resulting from the reflections at the image plane or between the cemented surface located closest to the image plane and a face plate, a low-pass filter or the like is generated in the vicinity of the center of the picture. When the value of the conditional expression (12) exceeds the upper limit, the refractive power of the cemented surface becomes too small, thus making it difficult to correct lateral chromatic aberration sufficiently. By satisfying the conditional expression (12), it is possible to correct lateral chromatic aberration favorably, while diverting ghosting or flare to the peripheral portion of the picture.

More preferably, the following conditional expression (12)' is satisfied.

$$130<R/RIH<200 \tag{12}'$$

In the zoom lens of the above-described configuration, it is also preferable the following conditional expression (13) is satisfied.

$$0.10<\{f_1+(1-\beta_{2w}^{-1})*f_2\}/\{f_1+(1-\beta_{2T}^{-1})*f_2\}<0.15$$

$$(\text{where } Z=f_T/f_W>8) \tag{13}$$

where f$_1$ is a focal length of the first lens group, f$_2$ is a focal length of the second lens group, β$_{2w}$ is a magnification of the second lens group at wide angle end, β$_{2T}$ is a magnification of the second lens group at telephoto angle end, f$_T$ is a focal length of the entire zoom lens at telephoto end, and f$_W$ is a focal length of the entire zoom lens at wide angle end.

When the value of the of the conditional expression (13) falls below the upper limit, an axial distance between the first lens group and the second lens group becomes too large, so that the ray passing through a position far distant from the optical axis in the first lens group. Consequently, the pincushion distortion tend to occur. When the value of the of the conditional expression (13) falls below the lower limit, an axial distance between the first lens group and the second lens group becomes narrow, so that the ray passing through a low position from the optical axis in the first lens group, then the first lens group can be made small. However, since the incidence angle to the second lens group becomes large, the flare for the lower ray tend to occurs.

In the zoom lens of the above-described configuration, it is also preferable the following conditional expression (14) is satisfied.

$$0.85<(f_T/f_W)(\beta_{2T}/\beta_{2w})<1.0$$

$$(\text{where } Z=f_T/f_W>8) \tag{14}$$

where

β$_{2w}$ is a magnification of the second lens group at wide angle end,

β$_{2T}$ is a magnification of the second lens group at telephoto angle end, f$_T$ is a focal length of the entire zoom lens at telephoto end, and f$_W$ is a focal length of the entire zoom lens at wide angle end.

When the value of the of the conditional expression (13) falls below the upper limit, a magnification change of the second lens group during the zooming ation from wide angle end to telephoto end become too large, so that strengthening of the optical power of the second lens group is required. Therefore, since a curvature of field deteriorate, it is difficult to maintain high resolution on the peripheral area of the image plane. When the value of the of the conditional expression (13) falls below the lower limit, in order to secure a magnification of zooming, the amount of movements of the fourth lens group becomes large. For this reason, the change of both the exit pupil and aberration during zooming ation become large.

While the lens group of the first and the second embodiments comprise only refractive type lens elements that deflect the incident ray by refraction, the present invention is not limited thereto. For example, the lens group may comprise diffractive type lens elements that deflect the incident ray by diffraction, refractive-diffractive hybrid lens elements that deflect the incident ray by a combination of diffraction and refraction, or the like.

Moreover, in the first or second embodiment, it is possible to bend an optical pass of the zoom lens by providing a reflective surface on the optical pass. A bending position of the optical pass is adjustable. By adequately bending the optical pass, zoom lens can make it thin on appearance.

Moreover, in the first or second embodiment, although the optical low pass filter which has a flat plate shape is provided between the zoom lens and the imaging sensor, both a birefringent optical filter made of birefringence material such like quartz and diffractive optical filter having a diffraction can be adopted. Further, in the first or second embodiment, it is possible to delete the optical low pass filter based on the property of imaging sensor.

[Third Embodiment]

Figure 28:
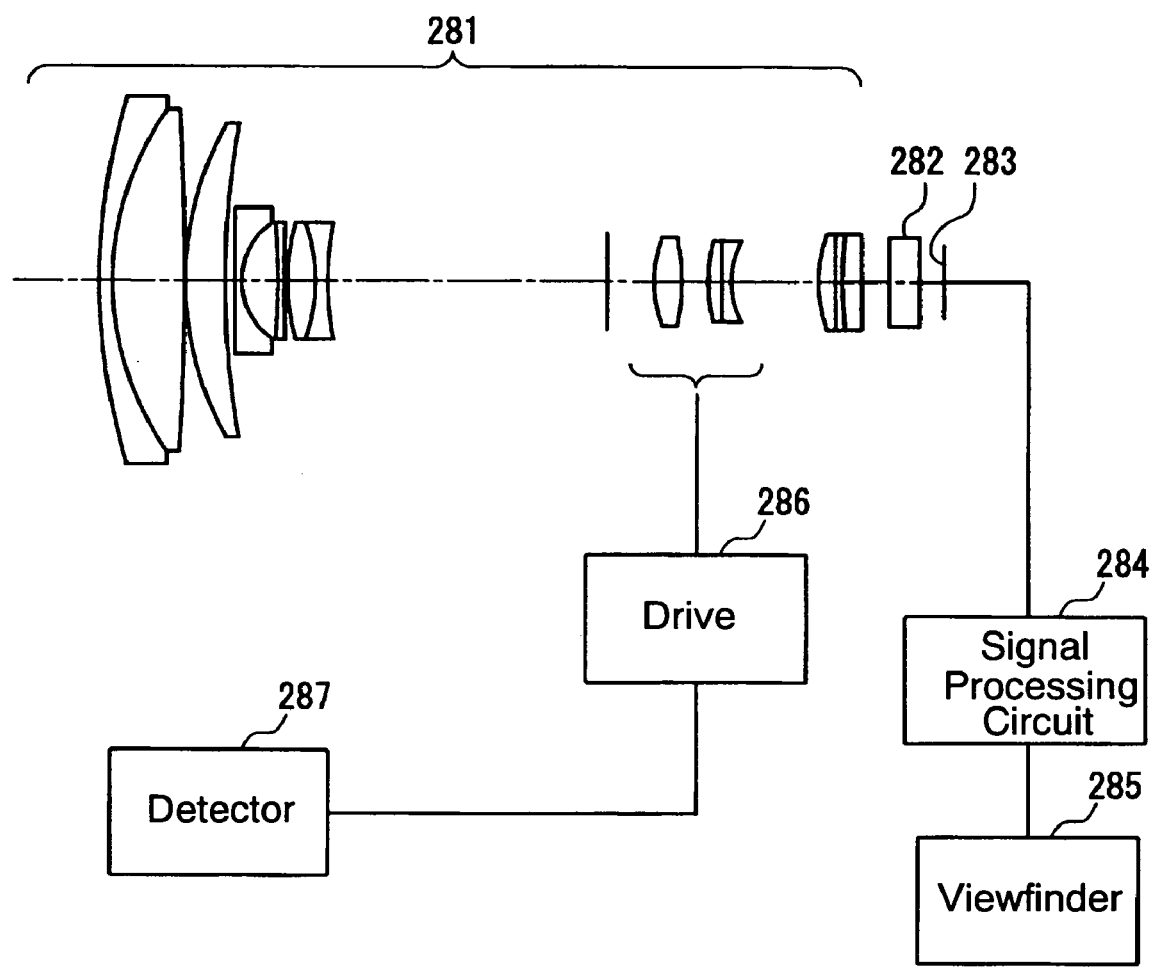
FIG. 28 is a layout drawing showing the configuration of a video camera according to a third embodiment.

FIG. 28 shows the configuration of a video camera according to a third embodiment.

As shown in FIG. 28, the video camera according to the present embodiment includes a zoom lens 281, as well as a low-pass filter 282 and an imaging element 283, arranged in that order on the image plane side of the zoom lens 281. Additionally, a viewfinder 285 is connected to the imaging element 283 through a signal processing circuit 284. Here, the zoom lens having a blurred image compensation function according to first embodiment above is used as the zoom lens 281, thus realizing a high-performance video camera having a blurred image compensation function. Further, a detector (sensor) 287 for detecting camera shake is connected to the third lens group of the zoom lens 281 through a drive (actuator) 286 for moving the third lens group in a direction perpendicular to the optical axis.

It should be noted that although the zoom lens described in first embodiment above was used in the present embodiment, this zoom lens may be replaced by, for example, the zoom lenses described in second embodiment above.

[Fourth Embodiment]

Figure 29:
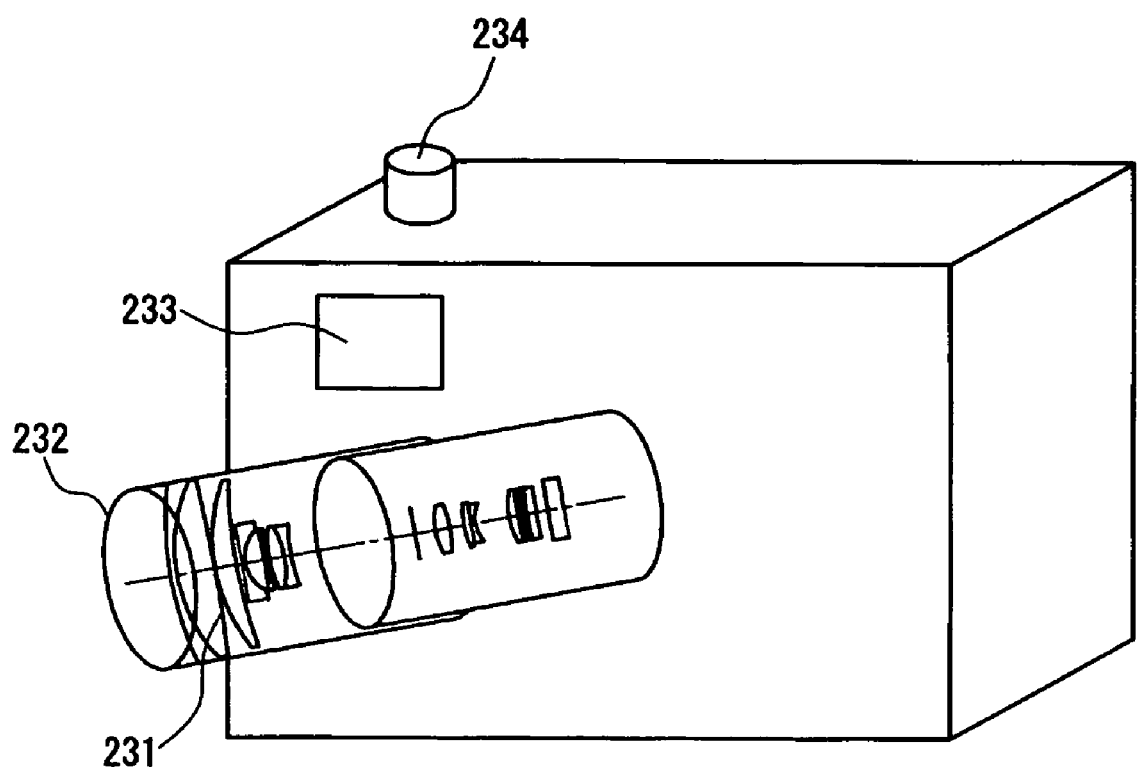
FIG. 29 is a layout drawing showing the configuration of a digital still camera according to a fourth embodiment.

FIG. 29 shows the configuration of a digital still camera according to a fourth embodiment.

In FIG. 29, the reference numeral 231 denotes the zoom lens having a blurred image compensation function according to first embodiment 1 above. The numeral 232 denotes a collapsing lens barrel, 233 denotes an optical viewfinder and 234 denotes a shutter.

It should be noted that although the zoom lens described in first embodiment above was used in the present embodiment, this zoom lens may be replaced by, for example, the zoom lenses described in second embodiment above.

NUMERICAL EXAMPLE

Hereinafter, the numerical examples corresponding to the above-mentioned zoom lens of the first embodiment or the second embodiment are shown. In each of numerical examples, r (mm) denotes the radius of curvature of the lens face, d (mm) denotes the thickness of each lens or the air space between each pair of adjacent lenses, n denotes the refractive index of each lens at the d-line and vd denotes the Abbe number of each lens at the d-line. Further, In each of numerical examples, all of aspherical surfaces are defined by the above-mentioned formula (AS).

In each of numerical examples, optical performance is exhibited by longitudinal aberration diagrams, when the blurred image compensation function is not effective. And optical performance is exhibited by lateral aberration diagrams, when the blurred image compensation function is effective. The longitudinal aberration diagrams, from the left to the right, responds to spherical aberration diagram A, astigmatism diagram B, distortion diagram C, axial chromatic aberration diagram D and lateral chromatic aberration diagram E.

In spherical aberration diagram A, and axial chromatic aberration diagram D, vertical axes express the F number. In astigmatism diagram B, distortion diagram C and lateral chromatic aberration diagram E, vertical axes express the half angle of view. It should be noted that in the spherical aberration diagram A, a spherical aberration values at the d-line are indicated. In the astigmatism diagram B, the solid line indicates the sagittal curvature of field and the dashed line indicates the meridional curvature of field. In the axial chromatic aberration diagram D, the solid line indicates values at the d-line, the short dashed line indicates values at the F-line and the long dashed line indicates values at the C-line. In the lateral chromatic aberration diagram E, the short dashed line indicates values at the F-line and the long dashed line indicates values at the C-line.

In lateral aberration diagrams, A is a lateral aberration at a relative image height of 0.75, B is a lateral aberration at the center of the picture and C is a lateral aberration at a relative image height of −0.75. In these diagrams, the solid line indicates values at the d-line, the short dashes line indicates values at the F-line, the long dashed line indicates values at the C-line and the dash-dotted line indicates values at the g-line.

Numerical Example 1

Numerical example 1 corresponds to first embodiment as shown in FIG. 2. In relation to the numerical example 1, table 1 shows lens data, table 2 shows the aspheric surface coefficients of the zoom lens. Table 3 shows the variable air space (mm) by zooming when the object point is located at infinity from the tip of the most object side lens. In Table 3, f (mm), F/No and 2ω (°) denote, respectively, the focal length, the F number and the angle of view at the wide angle end, the standard position and the telephoto end.

TABLE 1

| Group | Surface | r | d | n | vd |
|---|---|---|---|---|---|
| 1 | 1 | 75.631 | 1.50 | 1.84666 | 23.8 |
|  | 2 | 41.383 | 7.80 | 1.49700 | 81.6 |
|  | 3 | −186.830 | 0.15 |  |  |
|  | 4 | 34.011 | 4.70 | 1.77250 | 49.6 |
|  | 5 | 78.408 | variable |  |  |

TABLE 1-continued

| Group | Surface | r | d | n | vd |
|---|---|---|---|---|---|
| | 6 | 78.408 | 0.70 | 1.83500 | 42.7 |
| | 7 | 7.855 | 4.80 | | |
| | 8 | −29.000 | 0.70 | 1.69680 | 55.5 |
| 2 | 9 | −500.000 | 0.26 | | |
| | 10 | 33.554 | 2.80 | 1.84666 | 23.8 |
| | 11 | −27.693 | 1.25 | 1.60602 | 57.5 |
| | 12 | 43.000 | variable | | |
| Stop | 13 | 0.000 | 1.70 | | |
| | 14 | 17.524 | 2.45 | 1.66547 | 55.2 |
| | 15 | −27.942 | 4.56 | | |
| 3 | 16 | 15.044 | 1.80 | 1.60311 | 60.7 |
| | 17 | −700.000 | 0.70 | 1.84666 | 23.8 |
| | 18 | 10.313 | variable | | |
| | 19 | 14.656 | 2.45 | 1.69680 | 55.5 |
| 4 | 20 | −55.279 | 1.20 | 1.83500 | 42.7 |
| | 21 | 100.000 | 2.00 | 1.51450 | 63.1 |
| | 22 | −50.000 | variable | | |
| 5 | 23 | ∞ | 2.70 | 1.51633 | 64.0 |
| | 24 | ∞ | | | |

TABLE 2

| Surface | 12 | 14 | 15 | 22 |
|---|---|---|---|---|
| K | 0.00000D+00 | −4.64942D−01 | −3.63954D+01 | 0.00000D+00 |
| D | −8.67123D−05 | −1.39191D−04 | −3.09058D−04 | 9.28676D−05 |
| E | 5.17987D−08 | −5.97372D−06 | −1.20566D−06 | −1.33202D−06 |
| F | −3.70414D−08 | 1.67914D−07 | 8.39841D−09 | 2.58982D−08 |
| G | 1.19723D−09 | −1.12919D−08 | −5.01461D−09 | 0.00000D+00 |
| H | −2.55646D−11 | 8.42407D−11 | 0.00000D+00 | 0.00000D+00 |
| I | 2.53818D−13 | 3.02349D−12 | 0.00000D+00 | 0.00000D+00 |
| J | −1.05602D−15 | −1.31752D−13 | 0.00000D+00 | 0.00000D+00 |

TABLE 3

| | Wide angle end | Standard Position | Telephoto end |
|---|---|---|---|
| f | 5.979 | 32.750 | 70.857 |
| F/No | 2.858 | 2.869 | 2.791 |
| 2ω | 64.136 | 12.408 | 5.736 |
| d5 | 0.700 | 27.515 | 34.150 |
| d12 | 35.550 | 8.735 | 2.100 |
| d18 | 10.433 | 5.049 | 8.888 |
| d22 | 2.000 | 7.384 | 3.545 |

FIGS. 3A to 5E show aberration diagrams for the wide angle end, the standard position and the telephoto end of the zoom lens according to the numerical example 1.

As clearly seen from the aberration diagrams shown in FIGS. 3A to 5E, the zoom lens of the present example has aberration correction properties sufficient to attain high resolution. Notably, the diagrams (FIGS. 3A to 5E) show little deviation which is, at least in part, illustrative of sufficient aberration correction properties. Of course, this and other factors illustrated by these diagrams are keenly understood by one of ordinary skill in the art.

Figure 6A:
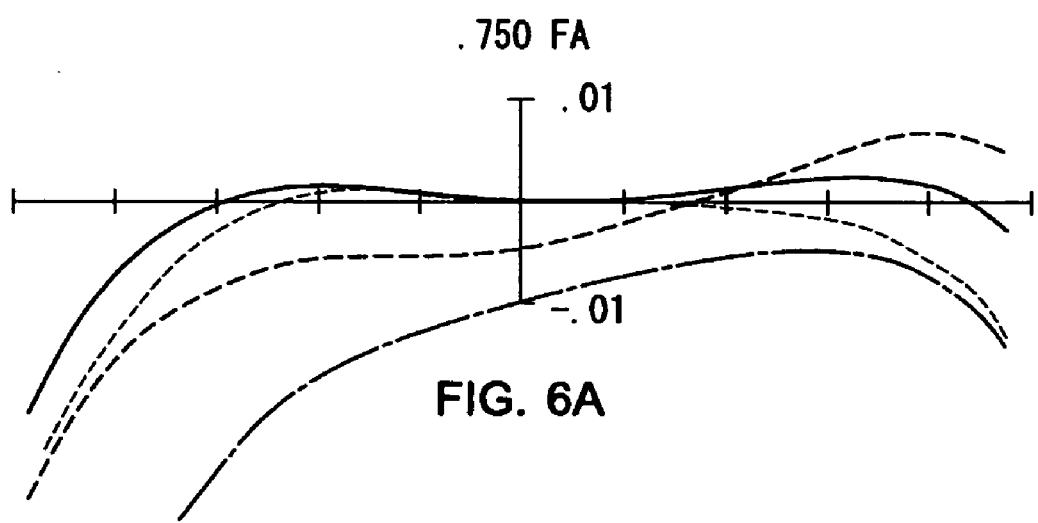
FIGS. 6A–C show lateral aberration diagrams for the telephoto end according to numerical example 1.
Figure 6B:
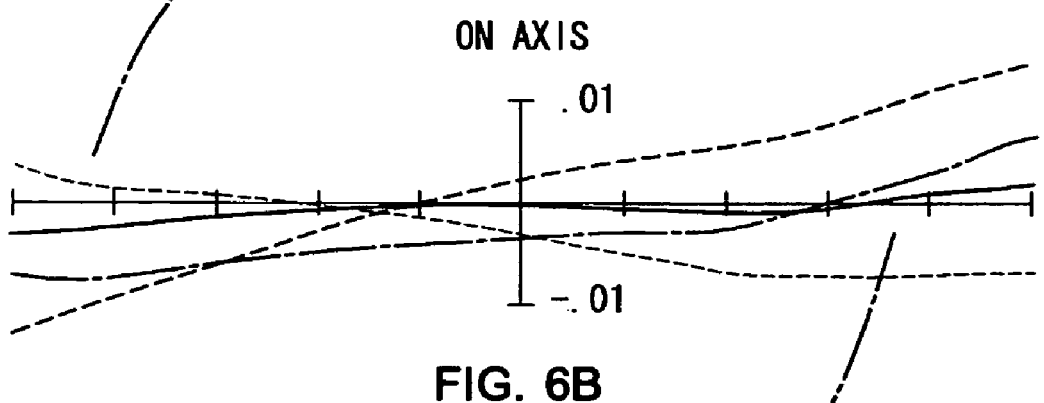
Figure 6C:
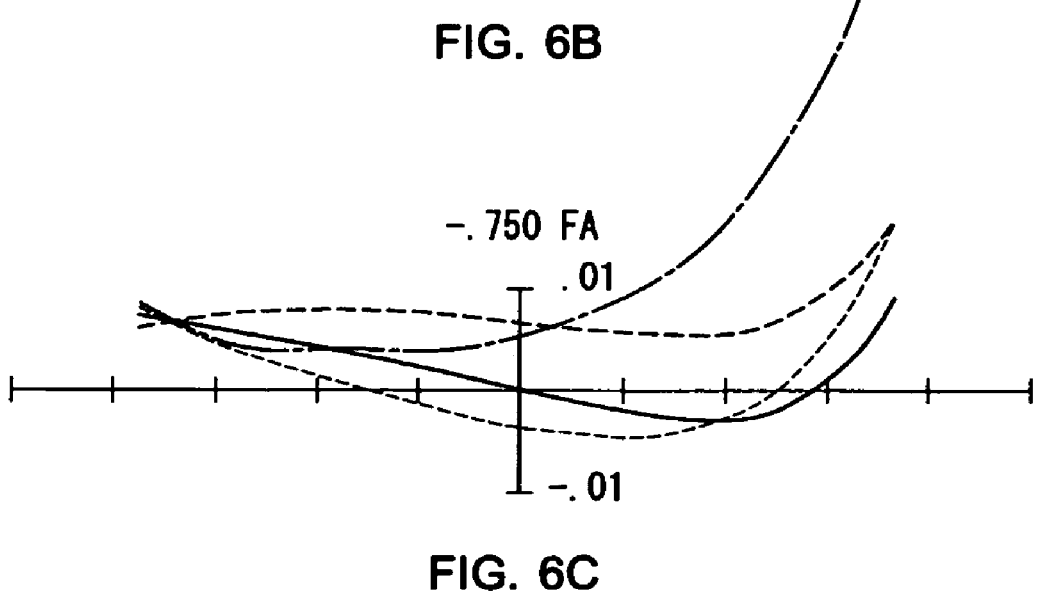

FIGS. 6A–C shows aberration diagrams for the telephoto end at the time of compensating for a blurred image caused by moving the zoom lens of 0.28°.

As can be seen from the aberration diagrams shown in FIG. 6A-C, the zoom lens of the present example exhibits favorable aberration properties even during zoom lens moving. Notably, aberration remains substantially within the same order of magnitude with and without camera shake. Of course, this and other factors illustrated by these diagrams are keenly understood by one of ordinary skill in the art.

The values of the conditional expressions for the zoom lens according to the present example are shown below.

$$|dsag1/CL|=0.018 \tag{1}$$

$$|dsag2/CL|=0.015 \tag{1}$$

$$dP_{g,F12}=0.0374 \tag{2}$$

$$dP_{g,d12}=0.0476 \tag{3}$$

$$dP_{C,A'12}=-0.0255 \tag{4}$$

$$dP_{g,F11}-dP_{g,F12}=-0.0238 \tag{5}$$

$$dP_{g,d11}-dP_{g,d12}=-0.0318 \tag{6}$$

$$dP_{C,A'11}-dP_{C,A'12}=0.0223 \tag{7}$$

$$f_{31}/f_{32}=0.68 \tag{8}$$

$$R/RIH=27.9 \tag{12}$$

$$\{f_1+(1-\beta_{2w}^{-1})*f_2\}/\{f_1+(1-\beta_{2T}^{-1})*f_2\}=0.13 \tag{13}$$

$$(f_T/f_W)(\beta_{2T}/\beta_{2w})=0.90 \tag{14}$$

Numerical Example 2

Numerical example 2 corresponds to first embodiment as shown in FIG. 2. In relation to the numerical example 2, table 4 shows lens data, table 5 shows the aspheric surface coefficients of the zoom lens. Table 6 shows the variable air space (mm) by zooming when the object point is located at infinity from the tip of the most object side lens. In Table 6, f (mm), F/No and 2ω (°) denote, respectively, the focal length, the F number and the angle of view at the wide angle end, the standard position and the telephoto end.

TABLE 4

| Group | Surface | r | d | n | vd |
|---|---|---|---|---|---|
| | 1 | 75.631 | 1.50 | 1.84666 | 23.8 |
| | 2 | 41.383 | 7.80 | 1.49700 | 81.6 |
| 1 | 3 | −186.830 | 0.15 | | |
| | 4 | 34.011 | 4.70 | 1.77250 | 49.6 |
| | 5 | 78.408 | variable | | |
| | 6 | 78.408 | 0.70 | 1.83500 | 42.7 |
| | 7 | 7.855 | 4.80 | | |
| | 8 | −29.000 | 0.70 | 1.69680 | 55.5 |
| 2 | 9 | −500.000 | 0.26 | | |
| | 10 | 33.554 | 2.80 | 1.84666 | 23.8 |
| | 11 | −27.693 | 1.25 | 1.60602 | 57.5 |
| | 12 | 43.000 | variable | | |
| Stop | 13 | 0.000 | 1.70 | | |
| | 14 | 17.330 | 2.45 | 1.66547 | 55.2 |
| | 15 | −28.904 | 4.56 | | |
| 3 | 16 | 15.120 | 1.80 | 1.60311 | 60.7 |
| | 17 | −700.000 | 0.70 | 1.84666 | 23.8 |
| | 18 | 10.423 | variable | | |
| | 19 | 14.936 | 2.45 | 1.69680 | 55.5 |
| 4 | 20 | −33.339 | 1.20 | 1.83500 | 42.7 |
| | 21 | 500.000 | 2.00 | 1.51450 | 63.1 |
| | 22 | −50.000 | variable | | |
| 5 | 23 | ∞ | 2.70 | 1.51633 | 64.0 |
| | 24 | ∞ | | | |

TABLE 5

| Surface | 12 | 14 | 15 | 22 |
|---|---|---|---|---|
| K | 0.00000D+00 | −9.46916D−03 | −4.03704D+01 | 0.00000D+00 |
| D | −8.67123D−05 | −1.34448D−04 | −2.94271D−04 | 8.92187D−05 |
| E | 5.17987D−08 | −5.79975D−06 | −8.30678D−07 | −1.45953D−06 |
| F | −3.70414D−08 | 1.85090D−07 | 1.51931D−08 | 2.94214D−08 |
| G | 1.19723D−09 | −1.11735D−08 | −4.65896D−09 | 0.00000D+00 |
| H | −2.55646D−11 | 9.31161D−11 | 0.00000D+00 | 0.00000D+00 |
| I | 2.53818D−13 | 2.89462D−12 | 0.00000D+00 | 0.00000D+00 |
| J | −1.05602D−15 | −1.22091D−13 | 0.00000D+00 | 0.00000D+00 |

TABLE 6

|  | Wide angle end | Standard Position | Telephoto end |
|---|---|---|---|
| f | 5.983 | 32.752 | 70.898 |
| F/No | 2.861 | 2.869 | 2.863 |
| 2ω | 64.036 | 12.408 | 5.732 |
| d5 | 0.700 | 27.515 | 34.150 |
| d12 | 35.550 | 8.735 | 2.100 |
| d18 | 10.433 | 5.047 | 8.887 |
| d22 | 2.000 | 7.387 | 3.546 |

FIGS. 7A to 9E show aberration diagrams for the wide angle end, the standard position and the telephoto end of the zoom lens according to the numerical example 2.

As clearly seen from the aberration diagrams shown in FIGS. 7A to 9E, the zoom lens of the present example has aberration correction properties sufficient to attain high resolution. Notably, the diagrams (FIGS. 7A to 9E) show little deviation which is, at least in part, illustrative of sufficient aberration correction properties. Of course, this and other factors illustrated by these diagrams are keenly understood by one of ordinary skill in the art.

Figure 10A:
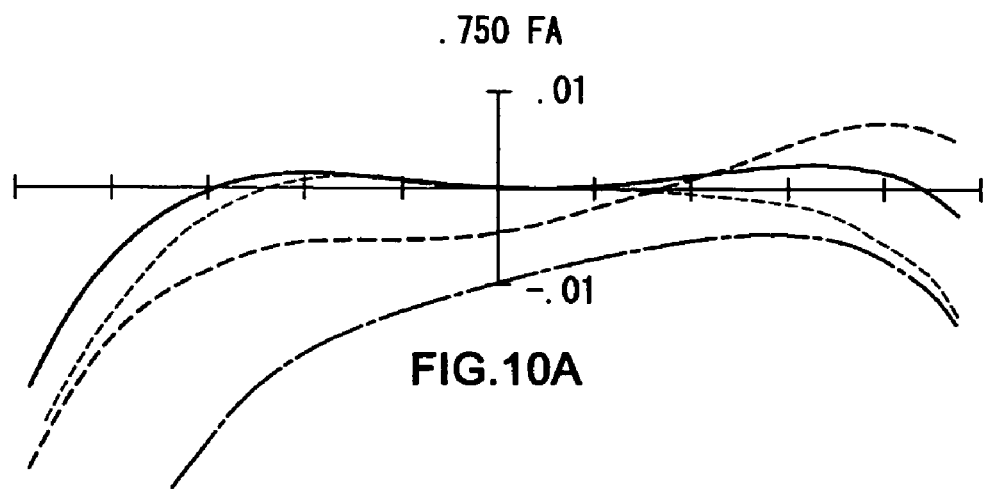
FIGS. 10A–C show lateral aberration diagrams for the telephoto end according to numerical example 2.
Figure 10B:
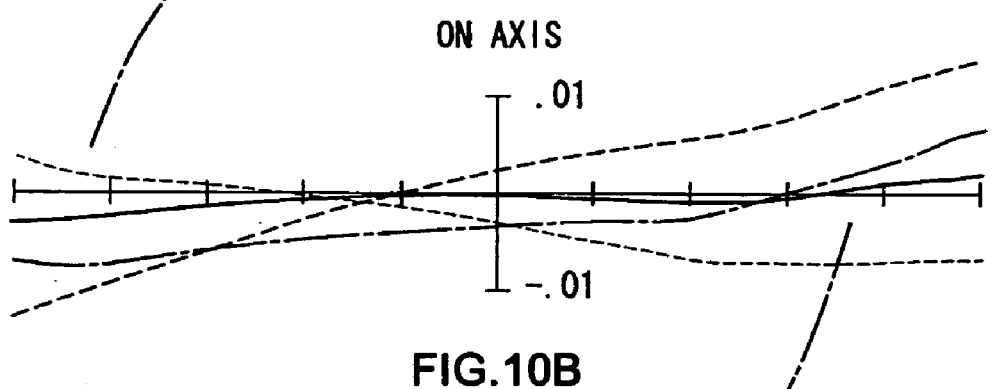
Figure 10C:
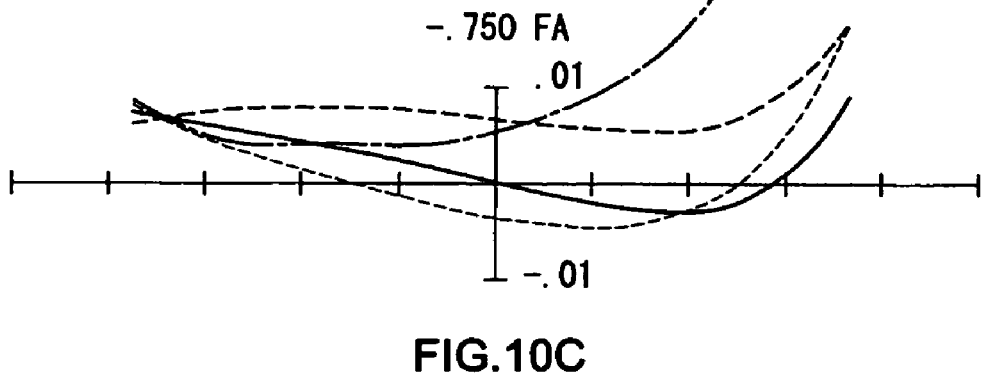

FIGS. 10A–C shows aberration diagrams for the telephoto end at the time of compensating for a blurred image caused by moving the zoom lens of 0.28°.

As can be seen from the aberration diagrams shown in FIGS. 10A–C, the zoom lens of the present example exhibits favorable aberration properties even during zoom lens moving. Notably, aberration remains substantially within the same order of magnitude with and without camera shake. Of course, this and other factors illustrated by these diagrams are keenly understood by one of ordinary skill in the art.

The values of the conditional expressions for the zoom lens according to the present example are shown below.

$$|dsag1/CL| = 0.016 \quad (1)$$

$$|dsag2/CL| = 0.013 \quad (1)$$

$$dP_{g,F12} = 0.0374 \quad (2)$$

$$dP_{g,d12} = 0.0476 \quad (3)$$

$$dP_{C,A'12} = -0.0255 \quad (4)$$

$$dP_{g,F11} - dP_{g,F12} = -0.0238 \quad (5)$$

$$dP_{g,d11} - dP_{g,d12} = -0.0318 \quad (6)$$

$$dP_{C,A'11} - dP_{C,A'12} = 0.0223 \quad (7)$$

$$f_{31}/f_{32} = 0.68 \quad (8)$$

$$R/RIH = 139.5 \quad (12)$$

$$\{f_1 + (1-\beta_{2w}^{-1})*f_2\}/\{f_1 + (1-\beta_{2T}^{-1})*f_2\} = 0.13 \quad (13)$$

$$(f_T/f_W)(\beta_{2T}/\beta_{2w}) = 0.90 \quad (14)$$

Numerical Example 3

Numerical example 3 corresponds to first embodiment as shown in FIG. 2. In relation to the numerical example 3, table 7 shows lens data, table 8 shows the aspheric surface coefficients of the zoom lens. Table 9 shows the variable air space (mm) by zooming when the object point is located at infinity from the tip of the most object side lens. In Table 9, f (mm), F/No and 2ω (°) denote, respectively, the focal length, the F number and the angle of view at the wide angle end, the standard position and the telephoto end.

TABLE 7

| Group | Surface | r | d | n | νd |
|---|---|---|---|---|---|
| 1 | 1 | 75.665 | 1.50 | 1.84666 | 23.8 |
|  | 2 | 41.431 | 7.80 | 1.49700 | 81.6 |
|  | 3 | −184.655 | 0.15 |  |  |
|  | 4 | 34.070 | 4.70 | 1.77250 | 49.6 |
|  | 5 | 78.443 | variable |  |  |
| 2 | 6 | 78.443 | 0.70 | 1.83500 | 42.7 |
|  | 7 | 7.847 | 4.80 |  |  |
|  | 8 | −29.000 | 0.70 | 1.69680 | 55.5 |
|  | 9 | −500.000 | 0.26 |  |  |
|  | 10 | 33.591 | 2.80 | 1.84666 | 23.8 |
|  | 11 | −27.471 | 1.25 | 1.60602 | 57.5 |
|  | 12 | 43.000 | variable |  |  |
| Stop | 13 | 0.000 | 1.70 |  |  |
|  | 14 | 15.058 | 2.45 | 1.60602 | 57.5 |
|  | 15 | −26.120 | 4.56 |  |  |
| 3 | 16 | 16.877 | 1.80 | 1.60311 | 60.7 |
|  | 17 | −700.000 | 0.70 | 1.84666 | 23.8 |
|  | 18 | 10.369 | variable |  |  |
|  | 19 | 14.915 | 2.45 | 1.69680 | 55.5 |
| 4 | 20 | −38.607 | 1.20 | 1.83500 | 42.7 |
|  | 21 | 300.000 | 2.00 | 1.51450 | 63.1 |
|  | 22 | −50.000 | variable |  |  |
| 5 | 23 | ∞ | 2.70 | 1.51633 | 64.0 |
|  | 24 | ∞ |  |  |  |

TABLE 8

| Surface | 12 | 14 | 15 | 22 |
|---|---|---|---|---|
| K | 0.00000D+00 | −1.13700D−01 | −3.34907D+01 | 0.00000D+00 |
| D | −8.78519D−05 | −1.30463D−04 | −2.95315D−04 | 8.17119D−05 |
| E | 1.48139D−07 | −5.48389D−06 | −1.47210D−07 | −1.21594D−06 |
| F | −4.51864D−08 | 1.86190D−07 | 2.98028D−08 | 2.57351D−08 |
| G | 1.45708D−09 | −1.10861D−08 | −6.27150D−09 | 0.00000D+00 |
| H | −2.61614D−11 | 6.34762D−11 | 0.00000D+00 | 0.00000D+00 |
| I | 1.00260D−13 | 1.75315D−12 | 0.00000D+00 | 0.00000D+00 |
| J | 1.38543D−15 | −8.89225D−14 | 0.00000D+00 | 0.00000D+00 |

TABLE 9

|  | Wide angle end | Standard Position | Telephoto end |
|---|---|---|---|
| f | 6.116 | 33.797 | 72.540 |
| F/No | 2.930 | 2.960 | 2.930 |
| 2ω | 62.878 | 12.022 | 5.606 |
| d5 | 0.700 | 27.525 | 34.150 |
| d12 | 35.550 | 8.725 | 2.100 |
| d18 | 10.433 | 4.848 | 8.827 |
| d22 | 2.000 | 7.585 | 3.606 |

FIGS. 11A to 13E show aberration diagrams for the wide angle end, the standard position and the telephoto end of the zoom lens according to the numerical example 3.

As clearly seen from the aberration diagrams shown in FIGS. 1A to 13E, the zoom lens of the present example has aberration correction properties sufficient to attain high resolution. Notably, the diagrams (FIGS. 11A to 13E) show little deviation which is, at least in part, illustrative of sufficient aberration correction properties. Of course, this and other factors illustrated by these diagrams are keenly understood by one of ordinary skill in the art.

Figure 14A:
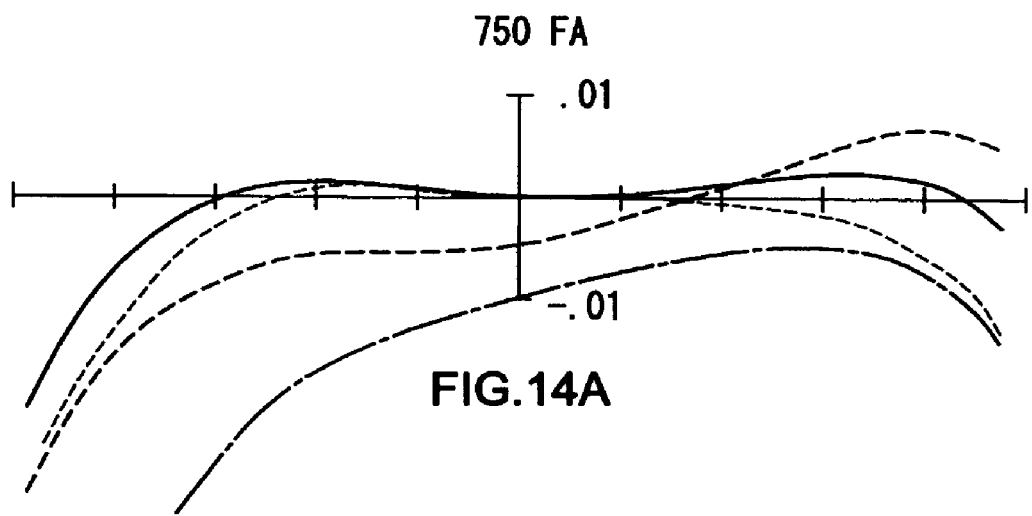
FIGS. 14A–C show lateral aberration diagrams for the telephoto end according to numerical example 3.
Figure 14B:
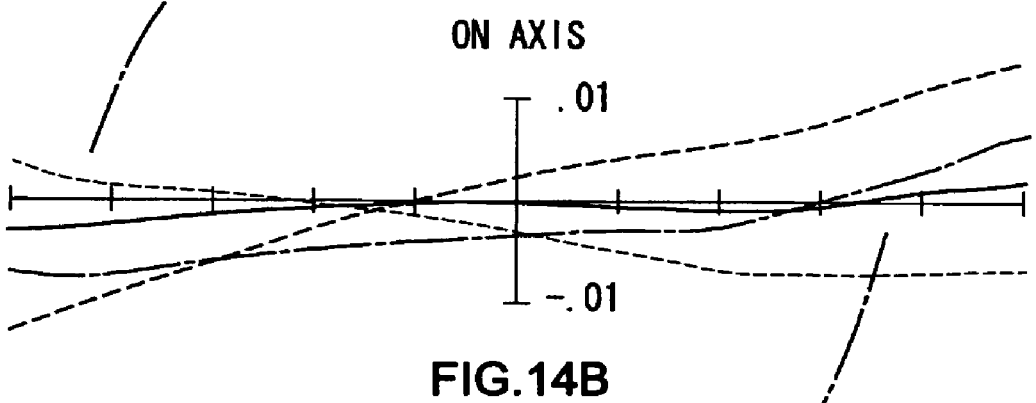
Figure 14C:
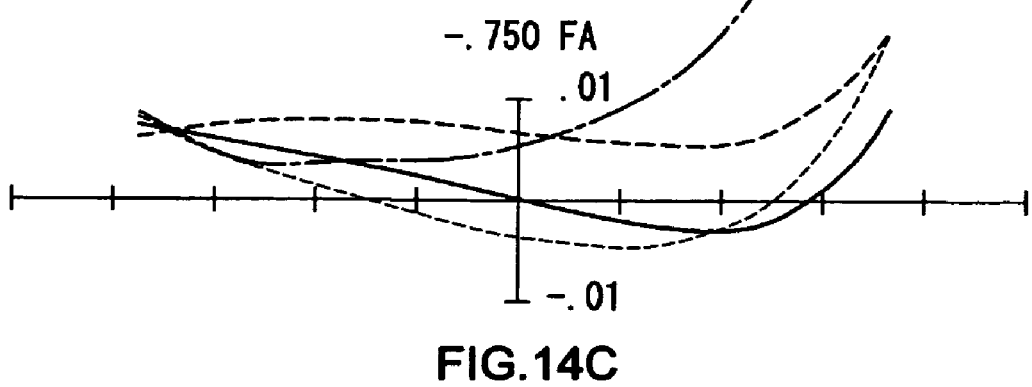

FIGS. 14A–C shows aberration diagrams for the telephoto end at the time of compensating for a blurred image caused by moving the zoom lens of 0.27°.

As can be seen from the aberration diagrams shown in FIG. 14A-C, the zoom lens of the present example exhibits favorable aberration properties even during zoom lens moving. Notably, aberration remains substantially within the same order of magnitude with and without camera shake. Of course, this and other factors illustrated by these diagrams are keenly understood by one of ordinary skill in the art.

The values of the conditional expressions for the zoom lens according to the present example are shown below.

$|dsag1/CL|=0.016$ (1)

$|dsag2/CL|=0.011$ (1)

$dP_{g,F12}=0.0374$ (1)

$dP_{g,d12}=0.0476$ (3)

$dP_{C,A'12}=-0.0255$ (4)

$dP_{g,F11}-dP_{g,F12}=-0.0238$ (5)

$dP_{g,d11}-dP_{g,d12}=-0.0318$ (6)

$dP_{C,A'11}-dP_{C,A'12}=0.0223$ (7)

$f_{31}/f_{32}=0.59$ (8)

$R/RIH=83.7$ (12)

$\{f_1+(1-\beta_{2w}^{-1})*f_2\}/\{f_1+(1-\beta_{2T}^{-1})*f_2\}=0.13$ (13)

$(f_T/f_W)(\beta_{2T}/\beta_{2w})=0.90$ (14)

Numerical Example 4

Numerical example 4 corresponds to second embodiment as shown in FIG. 15. In relation to the numerical example 4, table 10 shows lens data, table 11 shows the aspheric surface coefficients of the zoom lens. Table 12 shows the variable air space (mm) by zooming when the object point is located at infinity from the tip of the most object side lens. In Table 12, f (mm), F/No and 2ω (°) denote, respectively, the focal length, the F number and the angle of view at the wide angle end, the standard position and the telephoto end.

TABLE 10

| Group | Surface | r | d | n | vd |
|---|---|---|---|---|---|
| 1 | 1 | 64.727 | 1.50 | 1.84666 | 23.8 |
|  | 2 | 38.056 | 7.80 | 1.45650 | 90.3 |
|  | 3 | −389.481 | 0.15 |  |  |
|  | 4 | 35.815 | 4.70 | 1.77250 | 49.6 |
|  | 5 | 109.932 | variable |  |  |
|  | 6 | 109.932 | 0.70 | 1.83500 | 42.7 |

TABLE 10-continued

| Group | Surface | r | d | n | vd |
|---|---|---|---|---|---|
|  | 7 | 8.132 | 4.80 |  |  |
|  | 8 | −29.000 | 0.70 | 1.69680 | 55.5 |
| 2 | 9 | −500.000 | 0.26 |  |  |
|  | 10 | 33.603 | 2.80 | 1.84666 | 23.8 |
|  | 11 | −28.488 | 1.25 | 1.60602 | 57.5 |
|  | 12 | 43.000 | variable |  |  |
| Stop | 13 | 0.000 | 1.70 |  |  |
|  | 14 | 13.825 | 1.80 | 1.72916 | 54.7 |
|  | 15 | 749.774 | 4.56 |  |  |
| 3 | 16 | 14.650 | 1.90 | 1.66547 | 55.2 |
|  | 17 | −700.000 | 0.70 | 1.84666 | 23.8 |
|  | 18 | 12.467 | variable |  |  |
|  | 19 | 17.145 | 2.45 | 1.69680 | 55.5 |
| 4 | 20 | −16.344 | 1.20 | 1.83500 | 42.7 |
|  | 21 | 200.000 | 2.15 | 1.51450 | 63.1 |
|  | 22 | −38.056 | variable |  |  |
| 5 | 23 | ∞ | 2.70 | 1.51633 | 64.0 |
|  | 24 | ∞ |  |  |  |

TABLE 11

| Surface | 12 | 16 | 22 |
|---|---|---|---|
| K | 0.00000D+00 | −3.06222D+00 | 0.00000D+00 |
| D | −8.15595D−05 | 4.21327D−06 | 6.48865D−05 |
| E | −3.16042D−09 | −4.47096D−07 | −2.30334D−06 |
| F | 1.00900D−10 | 3.80739D−08 | 4.61871D−08 |
| G | −6.29871D−10 | −1.36889D−08 | 0.00000D+00 |
| H | −1.50380D−12 | 4.95837D−10 | 0.00000D+00 |
| I | 7.22389D−13 | 3.04490D−11 | 0.00000D+00 |
| J | −1.15777D−14 | −1.56635D−12 | 0.00000D+00 |

TABLE 12

|  | Wide angle end | Standard Position | Telephoto end |
|---|---|---|---|
| f | 5.9984 | 33.357 | 69.758 |
| F/No | 2.874 | 2.888 | 2.822 |
| 2ω | 64.986 | 12.212 | 5.834 |
| d5 | 0.700 | 27.714 | 34.150 |
| d12 | 35.550 | 8.536 | 2.100 |
| d18 | 10.433 | 4.389 | 8.251 |
| d22 | 2.000 | 8.045 | 4.183 |

FIGS. 16A to 18E show aberration diagrams for the wide angle end, the standard position and the telephoto end of the zoom lens according to the numerical example 4.

As clearly seen from the aberration diagrams shown in FIGS. 16A to 18E, the zoom lens of the present example has aberration correction properties sufficient to attain high resolution. Notably, the diagrams (FIGS. 16A to 18E) show little deviation which is, at least in part, illustrative of sufficient aberration correction properties. Of course, this and other factors illustrated by these diagrams are keenly understood by one of ordinary skill in the art.

Figure 19A:
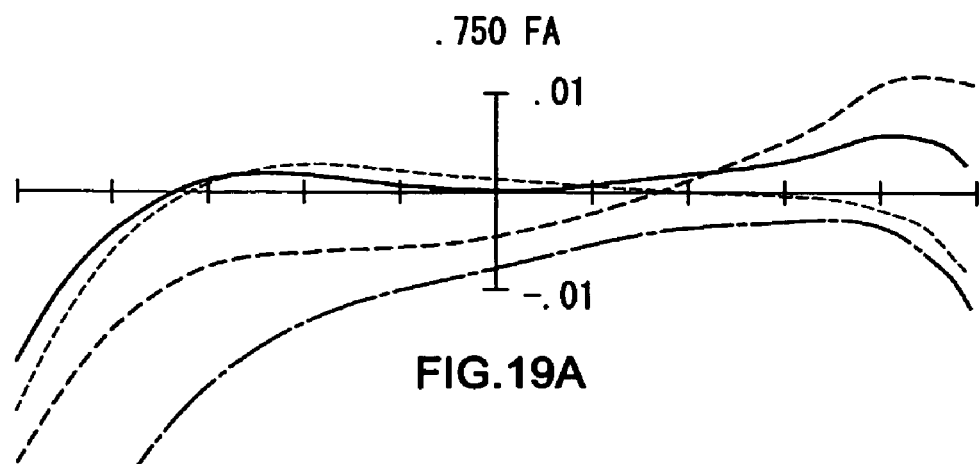
FIGS. 19A–C show lateral aberration diagrams for the telephoto end according to numerical example 4.
Figure 19B:
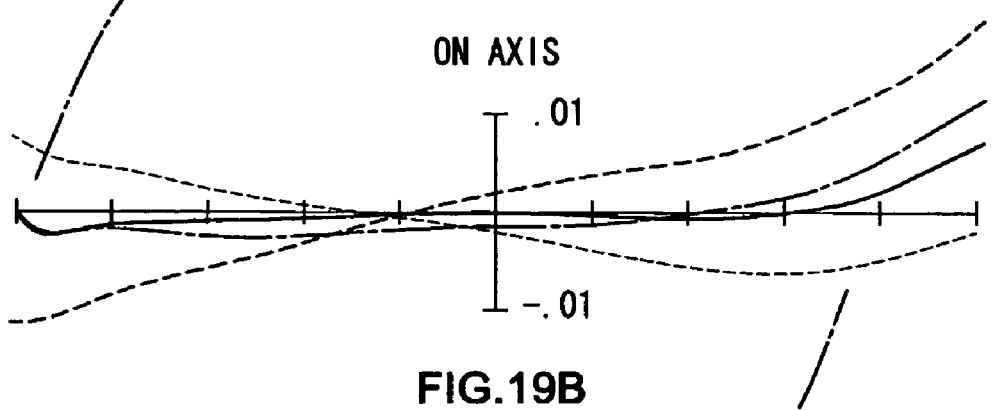
Figure 19C:
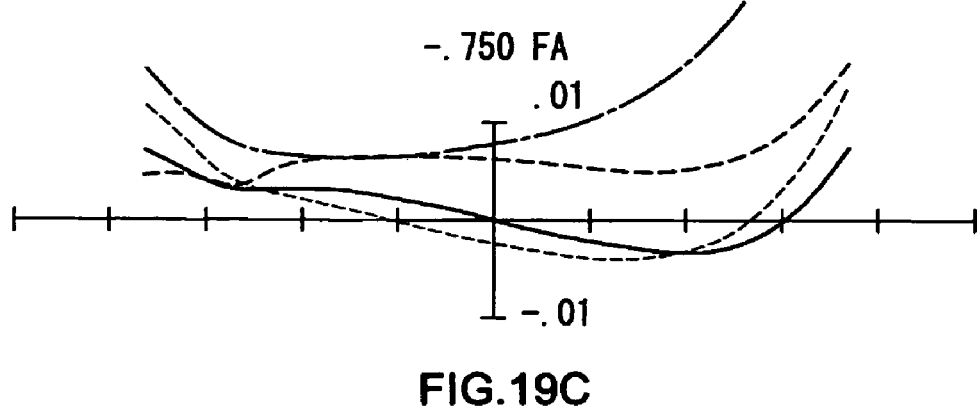

FIGS. 19A–C shows aberration diagrams for the telephoto end at the time of compensating for a blurred image caused by moving the zoom lens of 0.35°.

As can be seen from the aberration diagrams shown in FIG. 19A-C, the zoom lens of the present example exhibits favorable aberration properties even during zoom lens moving. Notably, aberration remains substantially within the same order of magnitude with and without camera shake. Of course, this and other factors illustrated by these diagrams are keenly understood by one of ordinary skill in the art.

The values of the conditional expressions for the zoom lens according to the present example are shown below.

$|dsag1/CL|=0.007$ (1)

$dP_{g,F12}=0.0504$ (2)

$dP_{g,d12}=0.0645$ (3)

$dP_{C,A'12}=-0.0359$ (4)

$dP_{g,F11}-dP_{g,F12}=-0.0368$ (5)

$dP_{g,d11}-dP_{g,d12}=-0.0487$ (6)

$dP_{C,A'11}-dP_{C,A'12}=0.0327$ (7)

$f_{31}/f_{32}=0.89$ (8)

$|p_2/p_1|=0.018$ (9)

$n_{d31}=1.72916$ (10)

$|v_{d31}-v_{d32}|=0.5$ (11)

$R/RIH=55.8$ (12)

$\{f_1+(1-\beta_{2w}^{-1})*f_2\}/\{f_1+(1-\beta_{2T}^{-1})*f_2\}=0.11$ (13)

$(f_T/f_W)(\beta_{2T}/\beta_{2w})=0.87$ (14)

Numerical Example 5

Numerical example 5 corresponds to second embodiment as shown in FIG. 15. In relation to the numerical example 5, table 13 shows lens data, table 14 shows the aspheric surface coefficients of the zoom lens. Table 15 shows the variable air space (mm) by zooming when the object point is located at infinity from the tip of the most object side lens. In Table 15, f (mm), F/No and 2ω (°) denote, respectively, the focal length, the F number and the angle of view at the wide angle end, the standard position and the telephoto end.

TABLE 13

| Group | Surface | R | d | n | vd |
|---|---|---|---|---|---|
| | 1 | 72.073 | 1.50 | 1.84666 | 23.8 |
| | 2 | 39.862 | 7.80 | 1.49700 | 81.6 |
| 1 | 3 | −301.022 | 0.15 | | |
| | 4 | 35.535 | 4.70 | 1.77250 | 49.6 |
| | 5 | 97.757 | variable | | |
| | 6 | 97.757 | 0.70 | 1.83500 | 42.7 |
| | 7 | 8.055 | 4.80 | | |
| | 8 | −29.000 | 0.70 | 1.69680 | 55.5 |
| 2 | 9 | −500.000 | 0.26 | | |
| | 10 | 33.536 | 2.80 | 1.84666 | 23.8 |
| | 11 | −28.400 | 1.25 | 1.60602 | 57.5 |
| | 12 | 43.000 | variable | | |
| Stop | 13 | 0.000 | 1.70 | | |
| | 14 | 12.982 | 1.80 | 1.72916 | 54.7 |
| | 15 | 222.975 | 4.56 | | |
| 3 | 16 | 14.544 | 1.80 | 1.66547 | 55.2 |
| | 17 | −700.000 | 0.70 | 1.84666 | 23.8 |
| | 18 | 11.954 | variable | | |
| | 19 | 15.650 | 2.45 | 1.69680 | 55.5 |
| 4 | 20 | −22.821 | 1.20 | 1.83500 | 42.7 |
| | 21 | 55.000 | 2.15 | 1.51450 | 63.1 |
| | 22 | −40.000 | variable | | |
| 5 | 23 | ∞ | 2.70 | 1.51633 | 64.0 |
| | 24 | ∞ | | | |

TABLE 14

| Surface | 12 | 16 | 22 |
|---|---|---|---|
| K | 0.00000D+00 | −3.26279D+00 | 0.00000D+00 |
| D | −8.07592D−05 | −5.06901D−06 | 6.99974D−05 |
| E | −3.58089D−07 | −9.32546D−07 | −1.80700D−06 |
| F | 1.47187D−08 | 4.87345D−08 | 3.44753D−08 |
| G | −5.71315D−10 | −1.34507D−08 | 0.00000D+00 |
| H | −2.94051D−11 | 4.60912D−10 | 0.00000D+00 |
| I | 1.51461D−12 | 2.82601D−11 | 0.00000D+00 |
| J | −1.82175D−14 | −1.45045D−12 | 0.00000D+00 |

TABLE 15

| | Wide angle end | Standard Position | Telephoto end |
|---|---|---|---|
| f | 5.969 | 32.959 | 68.096 |
| F/No | 2.853 | 2.876 | 2.800 |
| 2ω | 64.892 | 12.342 | 5.978 |
| d5 | 0.700 | 27.525 | 34.150 |
| d12 | 35.550 | 8.725 | 2.100 |
| d18 | 10.433 | 4.928 | 8.849 |
| d22 | 2.000 | 7.505 | 3.584 |

FIGS. 20A to 22E show aberration diagrams for the wide angle end, the standard position and the telephoto end of the zoom lens according to the numerical example 5.

As clearly seen from the aberration diagrams shown in FIGS. 20A to 22E, the zoom lens of the present example has aberration correction properties sufficient to attain high resolution. Notably, the diagrams (FIGS. 20A to 22E) show little deviation which is, at least in part, illustrative of sufficient aberration correction properties. Of course, this and other factors illustrated by these diagrams are keenly understood by one of ordinary skill in the art.

Figure 23A:
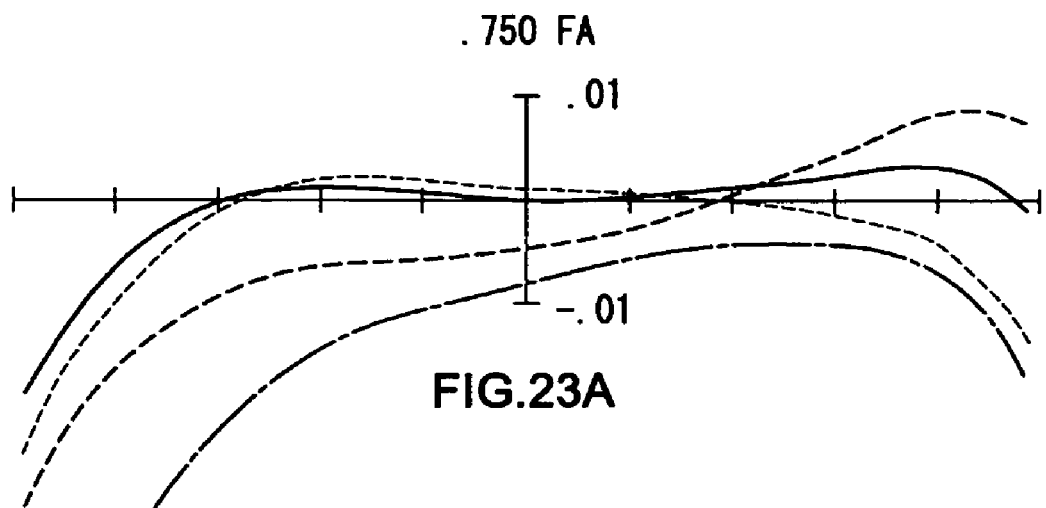
FIGS. 23A–C show lateral aberration diagrams for the telephoto end according to numerical example 5.
Figure 23B:
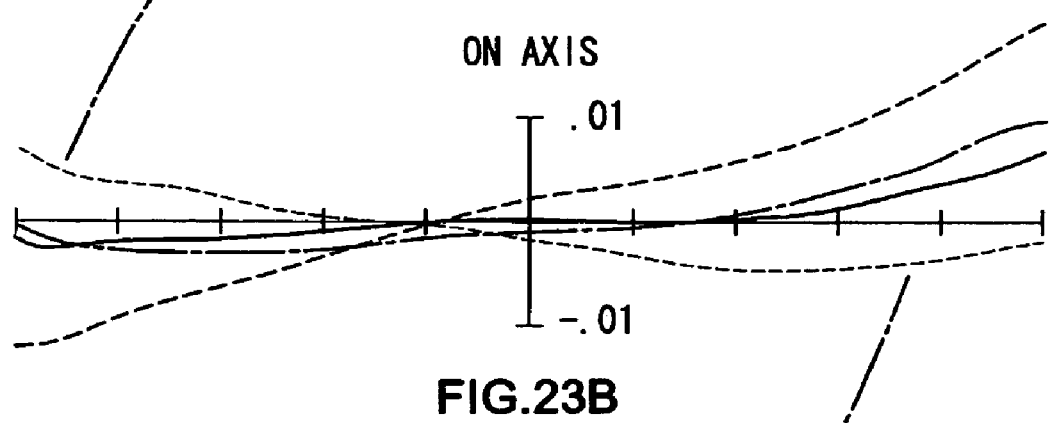
Figure 23C:
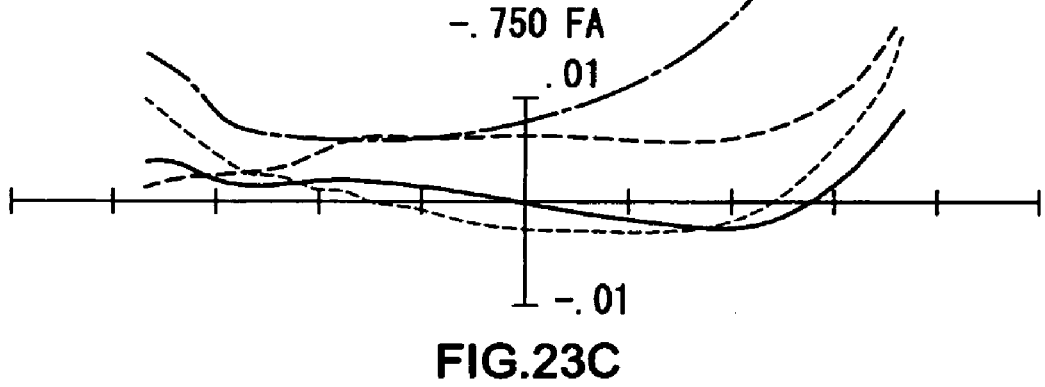

FIGS. 23A–C shows aberration diagrams for the telephoto end at the time of compensating for a blurred image caused by moving the zoom lens of 0.31°.

As can be seen from the aberration diagrams shown in FIG. 23A-C, the zoom lens of the present example exhibits favorable aberration properties even during zoom lens moving. Notably, aberration remains substantiallywithin the same order of magnitude with and without camera shake. Of course, this and other factors illustrated by these diagrams are keenly understood by one of ordinary skill in the art.

The values of the conditional expressions for the zoom lens according to the present example are shown below.

$|dsag1/CL|=0.0083$ (1)

$dP_{g,F12}=0.0374$ (2)

$dP_{g,d12}=0.0476$ (3)

$dP_{C,A'12}=-0.0255$ (4)

$dP_{g,F11}-dP_{g,F12}=-0.0238$ (5)

$dP_{g,d11}-dP_{g,d12}=-0.0318$ (6)

$dP_{C,A'11}-dP_{C,A'12}=-0.0223$ (7)

$f_{31}/f_{32}=0.83$ (8)

$|p_2/p_1|=0.058$ (9)

$n_{d31}=1.72916$ (10)

$|v_{d31}-v_{d32}|=0.5$ (11)

$R/RIH=15.3$ (12)

$\{f_1+(1-\beta_{2W}^{-1})*f_2\}/\{f_1+(1-\beta_{2T}^{-1})*f_2\}=0.12$ (13)

$(f_T/f_W)(\beta_{2T}/\beta_{2W})=0.87$ (14)

Numerical Example 6

Numerical example 6 corresponds to second embodiment as shown in FIG. 15. In relation to the numerical example 6, table 16 shows lens data, table 17 shows the aspheric surface coefficients of the zoom lens. Table 18 shows the variable air space (mm) by zooming when the object point is located at infinity from the tip of the most object side lens. In Table 18, f (mm), F/No and 2ω (°) denote, respectively, the focal length, the F number and the angle of view at the wide angle end, the standard position and the telephoto end.

TABLE 16

| Group | Surface | r | d | n | νd |
|---|---|---|---|---|---|
|  | 1 | 75.521 | 1.50 | 1.84666 | 23.8 |
|  | 2 | 41.189 | 7.80 | 1.49700 | 81.6 |
| 1 | 3 | −202.582 | 0.15 |  |  |
|  | 4 | 34.383 | 4.70 | 1.77250 | 49.6 |
|  | 5 | 82.773 | variable |  |  |
|  | 6 | 82.773 | 0.70 | 1.83500 | 42.7 |
|  | 7 | 7.916 | 4.80 |  |  |
|  | 8 | −29.000 | 0.70 | 1.69680 | 55.5 |
| 2 | 9 | −500.000 | 0.26 |  |  |
|  | 10 | 34.185 | 2.80 | 1.84666 | 23.8 |
|  | 11 | −27.799 | 1.25 | 1.60602 | 57.5 |
|  | 12 | 43.000 | variable |  |  |
| Stop | 13 | 0.000 | 1.70 |  |  |
|  | 14 | 13.466 | 1.80 | 1.72916 | 54.7 |
|  | 15 | 413.357 | 4.56 |  |  |
| 3 | 16 | 15.370 | 1.90 | 1.66547 | 55.2 |
|  | 17 | −700.000 | 0.70 | 1.84666 | 23.8 |
|  | 18 | 12.477 | variable |  |  |
|  | 19 | 16.956 | 2.45 | 1.69680 | 55.5 |
| 4 | 20 | −16.956 | 1.20 | 1.83500 | 42.7 |
|  | 21 | 100.000 | 2.25 | 1.51450 | 63.1 |
|  | 22 | −32.044 | variable |  |  |
| 5 | 23 | ∞ | 2.70 | 1.51633 | 64.0 |
|  | 24 | ∞ |  |  |  |

TABLE 17

| Surface | 12 | 16 | 22 |
|---|---|---|---|
| K | 0.00000D+00 | −3.49357D+00 | 0.00000D+00 |
| D | −8.99303D−05 | −7.73408D−06 | 7.00962D−05 |
| E | 5.69615D−07 | −6.03776D−07 | −2.91375D−06 |
| F | −6.03117D−08 | 4.22809D−08 | 5.67294D−08 |
| G | 1.89200D−09 | −1.35753D−08 | 2.65666D−09 |
| H | −4.94814D−11 | 4.95999D−10 | 1.24278D−10 |
| I | 9.88839D−13 | 3.03157D−11 | −2.38056D−11 |
| J | −9.96777D−15 | −1.63321D−12 | 6.21427D−13 |

TABLE 18

|  | Wide angle end | Standard Position | Telephoto end |
|---|---|---|---|
| f | 6.016 | 33.595 | 70.908 |
| F/No | 2.858 | 2.916 | 2.892 |
| 2ω | 64.000 | 12.098 | 5.740 |
| d5 | 0.700 | 27.688 | 34.150 |
| d12 | 35.550 | 8.562 | 2.100 |
| d18 | 10.433 | 4.478 | 8.392 |
| d22 | 2.000 | 7.956 | 4.041 |

FIGS. 24A to 26E show aberration diagrams for the wide angle end, the standard position and the telephoto end of the zoom lens according to the numerical example 6.

As clearly seen from the aberration diagrams shown in FIGS. 24A to 26E, the zoom lens of the present example has aberration correction properties sufficient to attain high resolution. Notably, the diagrams (FIGS. 24A to 26E) show little deviation which is, at least in part, illustrative of sufficient aberration correction properties. Of course, this and other factors illustrated by these diagrams are keenly understood by one of ordinary skill in the art.

Figure 27A:
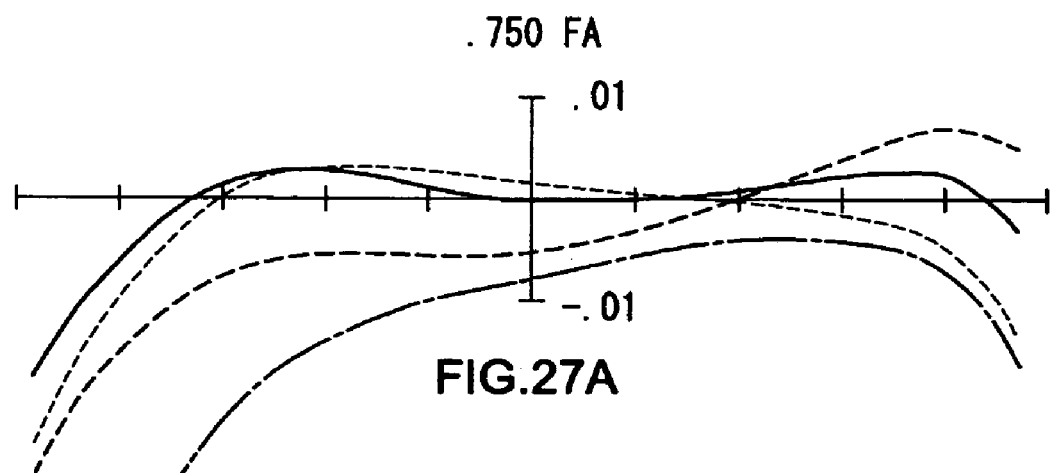
FIGS. 27A–C show lateral aberration diagrams for the telephoto end according to numerical example 6.
Figure 27B:
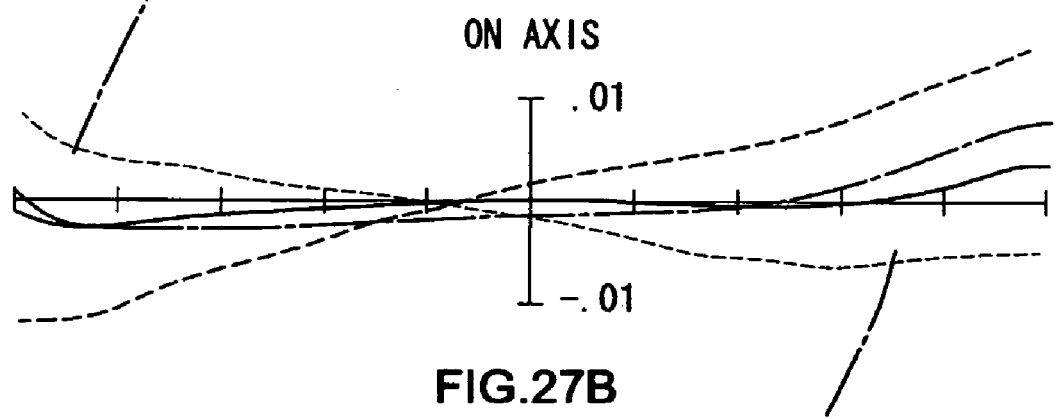
Figure 27C:
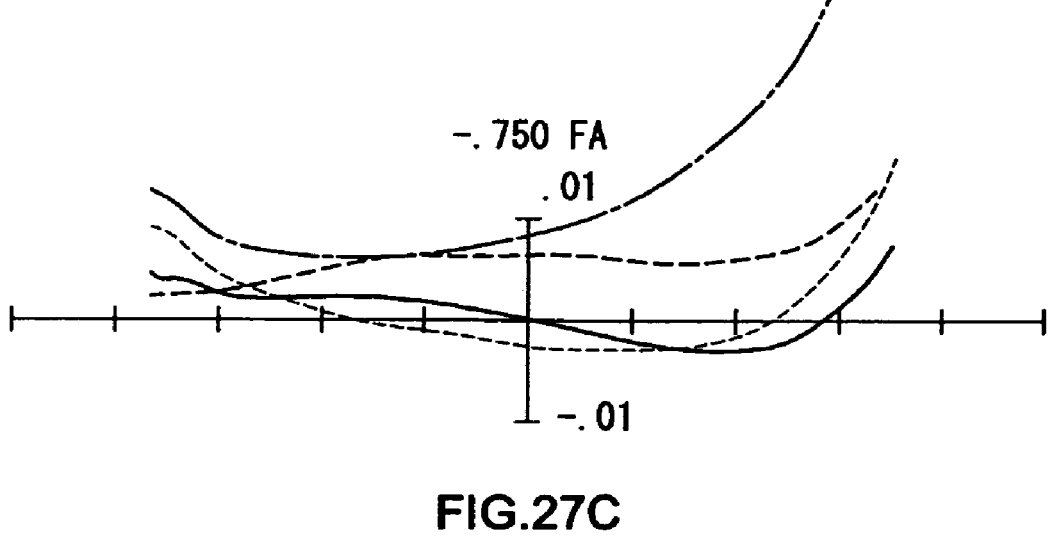

FIGS. 27A–C shows aberration diagrams for the telephoto end at the time of compensating for a blurred image caused by moving the zoom lens of 0.30°.

As can be seen from the aberration diagrams shown in FIG. 27A-C, the zoom lens of the present example exhibits favorable aberration properties even during zoom lens moving. Notably, aberration remains substantially within the same order of magnitude with and without camera shake. Of course, this and other factors illustrated by these diagrams are keenly understood by one of ordinary skill in the art.

The values of the conditional expressions for the zoom lens according to the present example are shown below.

$|dsag1/CL|=0.0083$ (1)

$dP_{g,F12}=0.0374$ (2)

$dP_{g,d12}=0.0476$ (3)

$dP_{C,A'12}=0.0255$ (4)

$dP_{g,F11}-dP_{g,F12}=-0.0238$ (5)

$dP_{g,d11}-dP_{g,d12}=-0.0318$ (6)

$dP_{C,A'11}-dP_{C,A'12}=0.0223$ (7)

$f_{31}/f_{32}=0.84$ (8)

$|p_2/p_1|0.033$ (9)

$n_{d31}=1.72916$ (10)

$|v_{d31}-v_{d32}|0.5$ (11)

$R/RIH=195.3$ (12)

$\{f_1+(1-\beta_{2W}^{-1})*f_2\}/\{f_1+(1-\beta_{2T}^{-1})*f_2\}=0.12$ (13)

$(f_T/f_W)(\beta_{2T}/\beta_{2W})=0.88$ (14)

While the invention has been described in detail, the foregoing description is in all aspects illustrative and not restrictive. It is understood that numerous other modifications and variations can be devised without departing from the scope of the invention.

What is claimed is:

1. A zoom lens, arranged in order from an object side to an image plane side, comprising:
   a first lens group having a positive optical power, fixed with respect to an image plane;
   a second lens group having a negative optical power, movable in a direction parallel to an optical axis for performing a zooming action;
   a third lens group having a positive optical power, including a movable lens element having at least one aspherical surface and movable in a direction perpendicular to the optical axis for compensating for a blurred image; and a fourth lens group having a positive optical power, movable in the direction parallel to the optical axis for adjusting a focus, the zoom lens satisfies the following conditional expression:

$$0.006 < |dsagi/CL| < 0.02$$

wherein

CL is an effective lens diameter of the at least one aspherical surface, and dsagi is an amount of asphericity at the effective lens diameter, wherein the third lens group comprises at least two lens elements, and wherein the third lens group includes a meniscus convex lens element and the following conditional expression is satisfied:

$$0.50 < f_{31}/f_{32} < 1.00$$

where $f_{31}$ is a focal length of the first lens of the third lens group, counted from the object side, and $f_{32}$ is a focal length of the second lens of the third lens group, counted from the object side.

2. The zoom lens according to claim 1, wherein the first lens group comprises at least two lens elements, and wherein the following conditional expressions are satisfied:

$$0.035 < dP_{g,F12} < 0.070$$

$$0.045 < dP_{g,d12} < 0.080$$

$$-0.040 < dP_{C,A'12} < -0.020$$

wherein $dP_{g,F12}$ is a constant of anomalous dispersion of the second lens element of the first lens group, counted from the object side, with respect to partial dispersion ratio for the g-line at 435 nm and the F-line at 486 nm, $dP_{g,d12}$ is a constant of anomalous dispersion of the second lens element of the first lens group, counted from the object side, with respect to partial dispersion ratio for the g-line at 435 nm and the d-line at 587 nm, and $dP_{C,A'12}$ is a constant of anomalous dispersion of the second lens element of the first lens group, counted from the object side, with respect to partial dispersion ratio for the C-line at 656 nm and the A'-line at 768 nm.

3. The zoom lens according to claim 1, wherein the first lens group comprises at least two lens elements, and wherein the following conditional expressions are satisfied:

$$-0.040 < dP_{g,F11} - dP_{g,F12} < -0.020$$

$$-0.055 < dP_{g,d11} - dP_{g,d12} < -0.025$$

$$0.018 < dP_{C,A'11} - dP_{C,A'12} < 0.036$$

wherein $dP_{g,F11}$ is a constant of anomalous dispersion of the first lens element of the first lens group, counted from the object side, with respect to partial dispersion ratio for the g-line at 435 nm and the F-line at 486 nm, $dP_{g,d11}$ is a constant of anomalous dispersion of the first lens element of the first lens group, counted from the object side, with respect to partial dispersion ratio for the g-line at 435 nm and the d-line at 587 nm, $dP_{C,A'11}$ is a constant of anomalous dispersion of the first lens element of the first lens group, counted from the object side, with respect to partial dispersion ratio for the C-line at 656 nm and the A'-line at 768 nm, $dP_{g,F12}$ is a constant of anomalous dispersion of the second lens element of the first lens group, counted from the object side, with respect to partial dispersion ratio for the g-line at 435 nm and the F-line at 486 nm, $dP_{g,d12}$ is a constant of anomalous dispersion of the second lens element of the first lens group, counted from the object side, with respect to partial dispersion ratio for the g-line at 435 nm and the d-line at 587 nm, and $dP_{C,A'12}$ is a constant of anomalous dispersion of the second lens element of the first lens group, counted from the object side, with respect to partial dispersion ratio for the C-line at 656 nm and the A'-line at 768 nm.

4. The zoom lens according to claim 1, wherein the third lens group includes a meniscus convex lens element and the following conditional expression is satisfied:

$$0.01 < |p_2/p_1| < 0.06$$

wherein $p_1$ is a power of the object side surface of the meniscus convex lens, and $p_2$ is a power of the image plane side surface of the meniscus convex lens.

5. The zoom lens according to claim 1, wherein the third lens group includes a meniscus convex lens element, a convex lens element and a concave lens element, arranged in that order from the object side to the image plane side, and the following conditional expressions are satisfied:

$$n_{31} > 1.65$$

$$|v_{d31} - v_{d32}| < 0.6$$

wherein $n_{d31}$ is a refractive index of the meniscus convex lens element, which is the first lens element of the third lens group, counted from the object side, $v_{d31}$ is an Abbe number of the meniscus convex lens element, which is the first lens element of the third lens group, counted from the object side, and $v_{d32}$ is an Abbe number of the convex lens element, which is the second lens element of the third lens group, counted from the object side.

6. The zoom lens according to claim 1, wherein the following conditional expression is satisfied:

$$15 < R/RIH < 210$$

wherein

RIH is an image height, and

R is a radius of curvature of the concave surface of the fourth lens group that is located closest to the image side.

7. The zoom lens according to claim 1, wherein the following conditional expression is satisfied:

$$0.10 < \{f_1 + (1-\beta_{2W}^{-1})*f_2\}/\{f_1 + (1-\beta_{2T}^{-1})*f_2\} < 0.15$$

(where $Z = f_T/f_W \geq 8$)

where $f_1$ is a focal length of the first lens group, $F_2$ is a focal length of the second lens group, $\beta_{2w}$ is a magnification of the second lens group at wide angle end, $\beta_{2T}$ is a magnification of the second lens group at telephoto angle end, $f_T$ is a focal length of the entire zoom lens at telephoto end, and $f_W$ is a focal length of the entire zoom lens at wide angle end.

8. The zoom lens according to claim 1, wherein the following conditional expression is satisfied:

$$0.85<(f_T/f_W)(\beta_{2T}/\beta_{2W})<1.0$$

(where $Z=f_T/f_W>8$)

where $\beta_{2W}$ is a magnification of the second lens group at wide angle end, $\beta_{2T}$ is a magnification of the second lens group at telephoto angle end, $f_T$ is a focal length of the entire zoom lens at telephoto end, and $f_W$ is a focal length of the entire zoom lens at wide angle end.

9. A zoom lens, arranged in order from an object side to an image plane side, comprising:

a first lens group having a positive optical power, fixed with respect to an image plane;

a second lens group having a negative optical power, movable in a direction parallel to an optical axis for performing a zooming action;

a third lens group having a positive optical power, including a movable lens element having at least one aspherical surface and movable in a direction perpendicular to the optical axis for compensating for a blurred image; and a fourth lens group having a positive optical power, movable in the direction parallel to the optical axis for adjusting a focus, the fourth lens group including a cemented lens element formed by cementing at least three lens elements, the zoom lens satisfies the following conditional expression:

$$0.006<|dsagi/CL|<0.02$$

wherein

CL is an effective lens diameter of the at least one aspherical surface, and dsagi is an amount of asphericity at the effective lens diameter, wherein the third lens group comprises at least two lens elements, and wherein the third lens group includes a meniscus convex lens element and the following conditional expression is satisfied.

$$0.50<f_{31}/f_{32}<1.00$$

where $f_{31}$ is a focal length of the first lens of the third lens group, counted from the object side, and $f_{32}$ is a focal length of the second lens of the third lens group, counted from the object side.

10. The zoom lens according to claim 9, wherein the cemented lens element is formed by cementing three lens elements which are, in order from the object side to the image plane side, a positive lens element, a negative lens element and a positive lens element.

11. The zoom lens according to claim 9, wherein the first lens group comprises at least two lens elements, and wherein the following conditional expressions are satisfied:

$$0.035<dP_{g,F12}<0.070$$

$$0.045<dP_{g,d12}<0.080$$

$$-0.040<dP_{C,A'12}<-0.020$$

wherein $dP_{g,F12}$ is a constant of anomalous dispersion of the second lens element of the first lens group, counted from the object side, with respect to partial dispersion ratio for the g-line at 435 nm and the F-line at 486 nm, $dP_{g,d12}$ is a constant of anomalous dispersion of the second lens element of the first lens group, counted from the object side, with respect to partial dispersion ratio for the g-line at 435 nm and the d-line at 587 nm, and $dP_{C,A'12}$ is a constant of anomalous dispersion of the second lens element of the first lens group, counted from the object side, with respect to partial dispersion ratio for the C-line at 656 nm and the A'-line at 768 nm.

12. The zoom lens according to claim 9, wherein the first lens group comprises at least two lens elements, and wherein the following conditional expressions are satisfied:

$$-0.040<dP_{g,F11}-dP_{g,F12}<-0.020$$

$$-0.055<dP_{g,F11}-dP_{g,d12}<-0.025$$

$$0.018<dP_{C,A'11}-dP_{C,A'12}<0.036$$

wherein $dP_{g,F11}$ is a constant of anomalous dispersion of the first lens element of the first lens group, counted from the object side, with respect to partial dispersion ratio for the g-line at 435 nm and the F-line at 486 nm, $dP_{g,d11}$ is a constant of anomalous dispersion of the first lens element of the first lens group, counted from the object side, with respect to partial dispersion ratio for the g-line at 435 nm and the d-line at 587 nm, $dP_{C,A'}$ is a constant of anomalous dispersion of the first lens element of the first lens group, counted from the object side, with respect to partial dispersion ratio for the C-line at 656 nm and the A'-line at 768 nm, $dP_{g,F12}$ is a constant of anomalous dispersion of the second lens element of the first lens group, counted from the object side, with respect to partial dispersion ratio for the g-line at 435 nm and the F-line at 486 nm, $dP_{g,d12}$ is a constant of anomalous dispersion of the second lens element of the first lens group, counted from the object side, with respect to partial dispersion ratio for the g-line at 435 nm and the d-line at 587 nm, and $dP_{C,A'12}$ is a constant of anomalous dispersion of the second lens element of the first lens group, counted from the object side, with respect to partial dispersion ratio for the C-line at 656 nm and the A'-line at 768 nm.

13. The zoom lens according to claim 9, wherein the third lens group includes a meniscus convex lens element and the following conditional expression is satisfied:

$$0.01<|p_2/p_1|<0.06$$

wherein $p_1$ is a power of the object side surface of the meniscus convex lens, and $p_2$ is a power of the image plane side surface of the meniscus convex lens.

14. The zoom lens according to claim 9,
wherein the third lens group includes a meniscus convex lens element, a convex lens element and a concave lens element, arranged in that order from the object side to the image plane side, and the following conditional expressions are satisfied:

$$n_{d31}>1.65$$

$$|\nu_{d31}-\nu_{d32}|<0.6$$

wherein $n_{d31}$ is a refractive index of the meniscus convex lens element, which is the first lens element of the third lens group, counted from the object side, $\nu_{d32}$ is an Abbe number of the meniscus convex lens element, which is the first lens element of the third lens group, counted from the object side, and $\nu_{d32}$ is an Abbe number of the convex lens element, which is the second lens element of the third lens group, counted from the object side.

15. The zoom lens according to claim 9, wherein the following conditional expression is satisfied:

$$15<R/RIH<210$$

wherein

RIH is an image height, and

R is a radius of curvature of the concave surface of the fourth lens group that is located closest to the image side.

16. The zoom lens according to claim 9, wherein the following conditional expression is satisfied:

$$0.10<\{f_1+(1-\beta_{2w}^{-1})*f_2\}/\{f_1+(1-\beta_{2T}^{-1})*f_2\}<0.15$$

(where $Z=f_T/f_W>8$)

where $f_1$ is a focal length of the first lens group, $f_2$ is a focal length of the second lens group, $\beta_{2w}$ is a magnification of the second lens group at wide angle end, $\beta_{2T}$ is a magnification of the second lens group at telephoto angle end, $f_T$ is a focal length of the entire zoom lens at telephoto end, and $f_W$ is a focal length of the entire zoom lens at wide angle end.

17. The zoom lens according to claim 9, wherein the following conditional expression is satisfied:

$$0.85<(f_T/f_w)(\beta_{2T}/\beta_{2w})<1.0$$

(where $Z=f_T/f_W>8$)

where $\beta_{2w}$ is a magnification of the second lens group at wide angle end, $\beta_{2T}$ is a magnification of the second lens group at telephoto angle end, $f_T$ is a focal length of the entire zoom lens at telephoto end, and $f_W$ is a focal length of the entire zoom lens at wide angle end.

* * * * *